US012120664B2

(12) United States Patent
Elshafie et al.

(10) Patent No.: US 12,120,664 B2
(45) Date of Patent: *Oct. 15, 2024

(54) CONFIGURATION AND SIGNALING TECHNIQUES FOR SCHEDULED WIRELESS COMMUNICATIONS

(71) Applicant: QUALCOMM Incorporated, San Diego, CA (US)

(72) Inventors: Ahmed Elshafie, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 444 days.

This patent is subject to a terminal disclaimer.

(21) Appl. No.: 17/483,495

(22) Filed: Sep. 23, 2021

(65) Prior Publication Data

US 2023/0090671 A1 Mar. 23, 2023

(51) Int. Cl.
*H04W 72/20* (2023.01)
*H04W 72/1263* (2023.01)
*H04W 72/23* (2023.01)
*H04W 72/566* (2023.01)

(52) U.S. Cl.
CPC ....... *H04W 72/1263* (2013.01); *H04W 72/20* (2023.01); *H04W 72/23* (2023.01); *H04W 72/566* (2023.01)

(58) Field of Classification Search
None
See application file for complete search history.

(56) References Cited

U.S. PATENT DOCUMENTS

| | | | |
|---|---|---|---|
| 10,594,390 B1 * | 3/2020 | Pawar | H04B 7/0617 |
| 10,749,592 B1 * | 8/2020 | Marupaduga | H04B 7/15542 |
| 2015/0070187 A1 * | 3/2015 | Wiesner | G16H 40/67 |
| | | | 340/870.02 |
| 2017/0353819 A1 * | 12/2017 | Yin | H04W 4/70 |
| 2017/0359835 A1 * | 12/2017 | Seo | H04B 7/2606 |
| 2020/0213977 A1 * | 7/2020 | Xu | H04W 4/70 |
| 2020/0296738 A1 * | 9/2020 | Inokuchi | H04W 72/21 |
| 2020/0296795 A1 * | 9/2020 | Uchiyama | H04L 1/1825 |
| 2021/0266715 A1 * | 8/2021 | Uchiyama | H04W 16/28 |
| 2022/0022210 A1 * | 1/2022 | Park | H04W 72/566 |
| 2022/0109970 A1 | 4/2022 | Jeong | |

(Continued)

*Primary Examiner* — Kodzovi Acolatse
(74) *Attorney, Agent, or Firm* — Holland & Hart LLP

(57) ABSTRACT

Methods, systems, and devices for wireless communications are described for relaying communications from a source device to a destination device via one or more relay devices. Scheduled resource grants may be used to provide resources for the relayed communications, and may provide one or more associated relaying parameters for relayed communications. A source device and relay device may use parameters to determine a relaying priority for multiple communications that are to be relayed. Additionally or alternatively, scheduled resource grants may include energy harvesting (EH) parameters for communications that use the scheduled resources. The EH parameters may include, for example, time-switching energy harvesting parameters that configure a first subset of symbols for data and a second subset of symbols for EH, or power-splitting EH where power of a received signal is split between EH components and decoding components.

27 Claims, 19 Drawing Sheets

(56) References Cited

U.S. PATENT DOCUMENTS

| | | | |
|---|---|---|---|
| 2022/0210698 A1* | 6/2022 | Ly | H04W 4/70 |
| 2022/0271893 A1* | 8/2022 | Liu | H04W 4/40 |
| 2022/0330361 A1* | 10/2022 | Ding | H04W 48/10 |
| 2022/0394592 A1* | 12/2022 | Chen | H04W 40/246 |
| 2023/0082175 A1* | 3/2023 | Ji | H04W 72/569 |
| | | | 370/315 |
| 2023/0146227 A1* | 5/2023 | Lee | H04W 72/25 |
| | | | 370/329 |
| 2023/0199875 A1* | 6/2023 | Back | H04W 76/14 |
| | | | 370/329 |
| 2023/0276305 A1* | 8/2023 | Wang | H04W 28/10 |
| | | | 370/329 |
| 2023/0284206 A1* | 9/2023 | Hoang | H04W 72/40 |
| | | | 370/329 |
| 2023/0309161 A1* | 9/2023 | Rao | H04L 5/0048 |
| 2023/0336962 A1* | 10/2023 | Chang | H04W 48/20 |
| 2023/0370902 A1* | 11/2023 | Wang | H04W 28/0268 |

* cited by examiner

CONFIGURATION AND SIGNALING TECHNIQUES FOR SCHEDULED WIRELESS COMMUNICATIONS

FIELD OF TECHNOLOGY

The following relates to wireless communications, including configuration and signaling techniques for scheduled wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support configuration and signaling techniques for scheduled wireless communications. In various aspects, the described techniques provide for relaying communications from a source (e.g., a source user equipment (UE)) to a destination (e.g., a destination UE) via one or more relay devices (e.g., relay UEs), where scheduled resource grants may be used to provide resources for the relayed communications. In some cases, the scheduled resource grants (e.g., semi-persistent scheduling (SPS) grants, or configured grants (CG)) may provide one or more associated relaying parameters for relayed communications. In some cases, a source device and relay device may use parameters to determine a relaying priority. Using such relaying priority, the relay device, in cases where multiple communications from one or more source devices are to be relayed, may determine which communication has priority and transmit accordingly. In some cases, priorities may be defined per transmitted packet or transport block (TB), and multiple levels of priority may be defined. In some cases, relaying priority may be defined per configured scheduled resource grant configuration (e.g., a CG or SPS index may have an associated relaying priority), or per transmission occasion of the scheduled resource grants.

Additionally or alternatively, in various aspects one or more devices may employ energy harvesting from transmissions of a transmitting device, and described techniques may provide for signaling of energy harvesting parameters for scheduled resource grants. The energy harvesting (EH) parameters may include, for example, time-switching (TS) energy harvesting parameters that configure a first subset of symbols for data and a second subset of symbols for EH (e.g., that may have higher power transmissions). In some cases, the EH parameters may include a splitting ratio for power-splitting (PS) EH, where power of a received signal is split between EH components and decoding components.

A method for wireless communication at a first device is described. The method may include receiving control signaling for scheduled resource grants for communications to one or more receiving devices, the control signaling identifying a first set of relay parameters for relayed communications that use a first set of multiple scheduled resource grants, and a second set of relay parameters for relayed communications that use a second set of multiple scheduled resource grants, determining that a first communication of two or more communications to be transmitted by the first device is a relayed communication for transmission using the first set of multiple scheduled resource grants, and that a second communication of the two or more communications is a relayed communication for transmission using the second set of multiple scheduled resource grants, and transmitting the first communication based on the first set of relay parameters and the second communication based on the second set of relay parameters.

An apparatus for wireless communication at a first device is described. The apparatus may include a processor, memory coupled with the processor, and instructions stored in the memory. The instructions may be executable by the processor to cause the apparatus to receive control signaling for scheduled resource grants for communications to one or more receiving devices, the control signaling identifying a first set of relay parameters for relayed communications that use a first set of multiple scheduled resource grants, and a second set of relay parameters for relayed communications that use a second set of multiple scheduled resource grants, determine that a first communication of two or more communications to be transmitted by the first device is a relayed communication for transmission using the first set of multiple scheduled resource grants, and that a second communication of the two or more communications is a relayed communication for transmission using the second set of multiple scheduled resource grants, and transmit the first communication based on the first set of relay parameters and the second communication based on the second set of relay parameters.

Another apparatus for wireless communication at a first device is described. The apparatus may include means for receiving control signaling for scheduled resource grants for communications to one or more receiving devices, the control signaling identifying a first set of relay parameters for relayed communications that use a first set of multiple scheduled resource grants, and a second set of relay parameters for relayed communications that use a second set of multiple scheduled resource grants, means for determining that a first communication of two or more communications to be transmitted by the first device is a relayed communication for transmission using the first set of multiple scheduled resource grants, and that a second communication of the two or more communications is a relayed communication for transmission using the second set of multiple scheduled resource grants, and means for transmitting the first communication based on the first set of relay parameters and the second communication based on the second set of relay parameters.

A non-transitory computer-readable medium storing code for wireless communication at a first device is described. The code may include instructions executable by a processor to receive control signaling for scheduled resource grants for communications to one or more receiving devices, the control signaling identifying a first set of relay parameters for relayed communications that use a first set of multiple scheduled resource grants, and a second set of relay parameters for relayed communications that use a second set of multiple scheduled resource grants, determine that a first communication of two or more communications to be transmitted by the first device is a relayed communication for transmission using the first set of multiple scheduled resource grants, and that a second communication of the two or more communications is a relayed communication for transmission using the second set of multiple scheduled resource grants, and transmit the first communication based on the first set of relay parameters and the second communication based on the second set of relay parameters.

In some examples of the method, apparatuses, and non-transitory computer-readable medium described herein, the first set of relay parameters indicates a first priority associated with the first set of multiple scheduled resource grants and the second set of relay parameters indicates a second priority associated with the second set of multiple scheduled resource grants, and where communications with the first priority are transmitted ahead of communications with the second priority when relayed by the first device. In some examples of the method, apparatuses, and non-transitory computer-readable medium described herein, an indication of the first priority or the second priority is provided for each packet or transport block (TB) to be relayed by the first device. In some examples of the method, apparatuses, and non-transitory computer-readable medium described herein, the control signaling indicates the first priority and the second priority from two or more different available levels of priority.

In some examples of the method, apparatuses, and non-transitory computer-readable medium described herein, the determining may include operations, features, means, or instructions for receiving, from one or more transmitting devices, the first communication and the second communication and determining that the first communication has the first priority and that the second communication has the second priority, based on a priority indication associated with each of the first communication and the second communication. In some examples of the method, apparatuses, and non-transitory computer-readable medium described herein, the first set of relay parameters may be provided with a first configured grant that has an associated first priority, and the second set of relay parameters may be provided with a second configured grant that has an associated second priority, and where communications with the first priority are transmitted ahead of communications with the second priority when relayed by the first device. In some examples of the method, apparatuses, and non-transitory computer-readable medium described herein, each configured grant has an index value, and each index value has an associated priority.

In some examples of the method, apparatuses, and non-transitory computer-readable medium described herein, the first set of multiple scheduled resource grants use a first subset of a set of transmission occasions of a configured grant, and the second set of multiple scheduled resource grants use a second subset of the set of transmission occasions of the configured grant, and where the first subset of transmission occasions is used for communications with a first priority and the second subset of transmission occasions is used for communications with a second priority. Some examples of the method, apparatuses, and non-transitory computer-readable medium described herein may further include operations, features, means, or instructions for receiving control information that activates the set of transmission occasions, and that indicates the first subset of transmission occasions and the second subset of transmission occasions.

In some examples of the method, apparatuses, and non-transitory computer-readable medium described herein, the first set of relay parameters indicates a first relaying type for the first set of multiple scheduled resource grants, and the second set of relay parameters indicates a second relaying type for the second set of multiple scheduled resource grants. In some examples of the method, apparatuses, and non-transitory computer-readable medium described herein, the first relaying type and the second relaying type may be selected from an amplify-and-forward (AF) relaying type, a decode-and-forward (DF) relaying type, or a compress-and-forward (CF) relaying type. In some examples of the method, apparatuses, and non-transitory computer-readable medium described herein, the first relaying type and the second relaying type may be selected based on a quality of service associated with the first set of multiple scheduled resource grants and the second set of multiple scheduled resource grants.

A method for wireless communication at a receiving device is described. The method may include receiving control signaling for a set of multiple scheduled resource grants from a transmitting device, the control signaling including one or more energy harvesting parameters that indicate a first portion of one or more of the set of multiple scheduled resource grants is for data communications and a second portion of the one or more of the set of multiple scheduled resource grants is for energy harvesting, receiving a first transmission of the set of multiple scheduled resource grants from the transmitting device, decoding information from the first portion of the first transmission according to the one or more energy harvesting parameters, and harvesting energy from the second portion of the first transmission according to the one or more energy harvesting parameters.

An apparatus for wireless communication at a receiving device is described. The apparatus may include a processor, memory coupled with the processor, and instructions stored in the memory. The instructions may be executable by the processor to cause the apparatus to receive control signaling for a set of multiple scheduled resource grants from a transmitting device, the control signaling including one or more energy harvesting parameters that indicate a first portion of one or more of the set of multiple scheduled resource grants is for data communications and a second portion of the one or more of the set of multiple scheduled resource grants is for energy harvesting, receive a first transmission of the set of multiple scheduled resource grants from the transmitting device, decode information from the first portion of the first transmission according to the one or more energy harvesting parameters, and harvesting energy from the second portion of the first transmission accord to the one or more energy harvesting parameters.

Another apparatus for wireless communication at a receiving device is described. The apparatus may include means for receiving control signaling for a set of multiple scheduled resource grants from a transmitting device, the control signaling including one or more energy harvesting parameters that indicate a first portion of one or more of the set of multiple scheduled resource grants is for data communications and a second portion of the one or more of the set of multiple scheduled resource grants is for energy harvesting, means for receiving a first transmission of the set of multiple scheduled resource grants from the transmitting device, means for decoding information from the first portion of the first transmission according to the one or more energy harvesting parameters, and means for harvesting energy from the second portion of the first transmission according to the one or more energy harvesting parameters.

A non-transitory computer-readable medium storing code for wireless communication at a receiving device is described. The code may include instructions executable by a processor to receive control signaling for a set of multiple scheduled resource grants from a transmitting device, the control signaling including one or more energy harvesting parameters that indicate a first portion of one or more of the set of multiple scheduled resource grants is for data communications and a second portion of the one or more of the set of multiple scheduled resource grants is for energy harvesting, receive a first transmission of the set of multiple scheduled resource grants from the transmitting device, decode information from the first portion of the first transmission according to the one or more energy harvesting parameters, and harvesting energy from the second portion of the first transmission accord to the one or more energy harvesting parameters.

In some examples of the method, apparatuses, and non-transitory computer-readable medium described herein, the one or more energy harvesting parameters indicate a time-switching energy harvesting configuration or a power-splitting energy harvesting configuration. In some examples of the method, apparatuses, and non-transitory computer-readable medium described herein, the receiving the control signaling may include operations, features, means, or instructions for receiving first control signaling that indicates a first configuration index value that has a first energy harvesting configuration, and second control signaling that indicates a second configuration index value that has a second energy harvesting configuration, and where the first energy harvesting configuration and the second energy harvesting configuration each have different energy harvesting parameters.

In some examples of the method, apparatuses, and non-transitory computer-readable medium described herein, the one or more energy harvesting parameters provide time-switching energy harvesting parameters that indicate that the first portion is a first subset of symbols of the first transmission and the second portion is a second subset of symbols of the first transmission. In some examples of the method, apparatuses, and non-transitory computer-readable medium described herein, the first subset of symbols is indicated by a starting symbol and number of symbols, or is indicated by a bitmap. In some examples of the method, apparatuses, and non-transitory computer-readable medium described herein, the one or more energy harvesting parameters further provides a gap of one or more symbols between the first subset of symbols and the second subset of symbols. Some examples of the method, apparatuses, and non-transitory computer-readable medium described herein may further include operations, features, means, or instructions for receiving control information that activates the set of multiple scheduled resource grants and that indicates one or more of the energy harvesting parameters.

A method for wireless communications at a base station is described. The method may include transmitting control signaling for a set of multiple scheduled resource grants to a receiving device, the control signaling including one or more energy harvesting parameters that indicate a first portion of one or more of the set of multiple scheduled resource grants is for data communications and a second portion of the one or more of the set of multiple scheduled resource grants is for energy harvesting, encoding information into the first portion of a first transmission according to the one or more energy harvesting parameters, and transmitting the first transmission of the set of multiple scheduled resource grants from the transmitting device, where the first portion of the first includes the encoded information and the second portion of the first transmission is transmitted using a transmit power that is selected to provide for efficient energy harvesting at the receiving device.

An apparatus for wireless communications at a base station is described. The apparatus may include a processor, memory coupled with the processor, and instructions stored in the memory. The instructions may be executable by the processor to cause the apparatus to transmit control signaling for a set of multiple scheduled resource grants to a receiving device, the control signaling including one or more energy harvesting parameters that indicate a first portion of one or more of the set of multiple scheduled resource grants is for data communications and a second portion of the one or more of the set of multiple scheduled resource grants is for energy harvesting, encode information into the first portion of a first transmission according to the one or more energy harvesting parameters, and transmit the first transmission of the set of multiple scheduled resource grants from the transmitting device, where the first portion of the first includes the encoded information and the second portion of the first transmission is transmitted using a transmit power that is selected to provide for efficient energy harvesting at the receiving device.

Another apparatus for wireless communications at a base station is described. The apparatus may include means for transmitting control signaling for a set of multiple scheduled resource grants to a receiving device, the control signaling including one or more energy harvesting parameters that indicate a first portion of one or more of the set of multiple scheduled resource grants is for data communications and a second portion of the one or more of the set of multiple scheduled resource grants is for energy harvesting, means for encoding information into the first portion of a first transmission according to the one or more energy harvesting parameters, and means for transmitting the first transmission of the set of multiple scheduled resource grants from the transmitting device, where the first portion of the first includes the encoded information and the second portion of the first transmission is transmitted using a transmit power that is selected to provide for efficient energy harvesting at the receiving device.

A non-transitory computer-readable medium storing code for wireless communications at a base station is described. The code may include instructions executable by a processor to transmit control signaling for a set of multiple scheduled resource grants to a receiving device, the control signaling including one or more energy harvesting parameters that indicate a first portion of one or more of the set of multiple scheduled resource grants is for data communications and a second portion of the one or more of the set of multiple scheduled resource grants is for energy harvesting, encode information into the first portion of a first transmission according to the one or more energy harvesting parameters, and transmit the first transmission of the set of multiple scheduled resource grants from the transmitting device, where the first portion of the first includes the encoded information and the second portion of the first transmission is transmitted using a transmit power that is selected to provide for efficient energy harvesting at the receiving device.

In some examples of the method, apparatuses, and non-transitory computer-readable medium described herein, the one or more energy harvesting parameters indicate a time-switching energy harvesting configuration or a power-splitting energy harvesting configuration. Some examples of the method, apparatuses, and non-transitory computer-readable medium described herein may further include operations, features, means, or instructions for transmitting first control signaling that indicates a first configuration index value that has a first energy harvesting configuration, and second control signaling that indicates a second configuration index value that has a second energy harvesting configuration, and where the first energy harvesting configuration and the second energy harvesting configuration each have different energy harvesting parameters. In some examples of the method, apparatuses, and non-transitory computer-readable medium described herein, the one or more energy harvesting parameters provide time-switching energy harvesting parameters that indicate that the first portion is a first subset of symbols of the first transmission and the second portion is a second subset of symbols of the first transmission.

DETAILED DESCRIPTION

Figure 1:
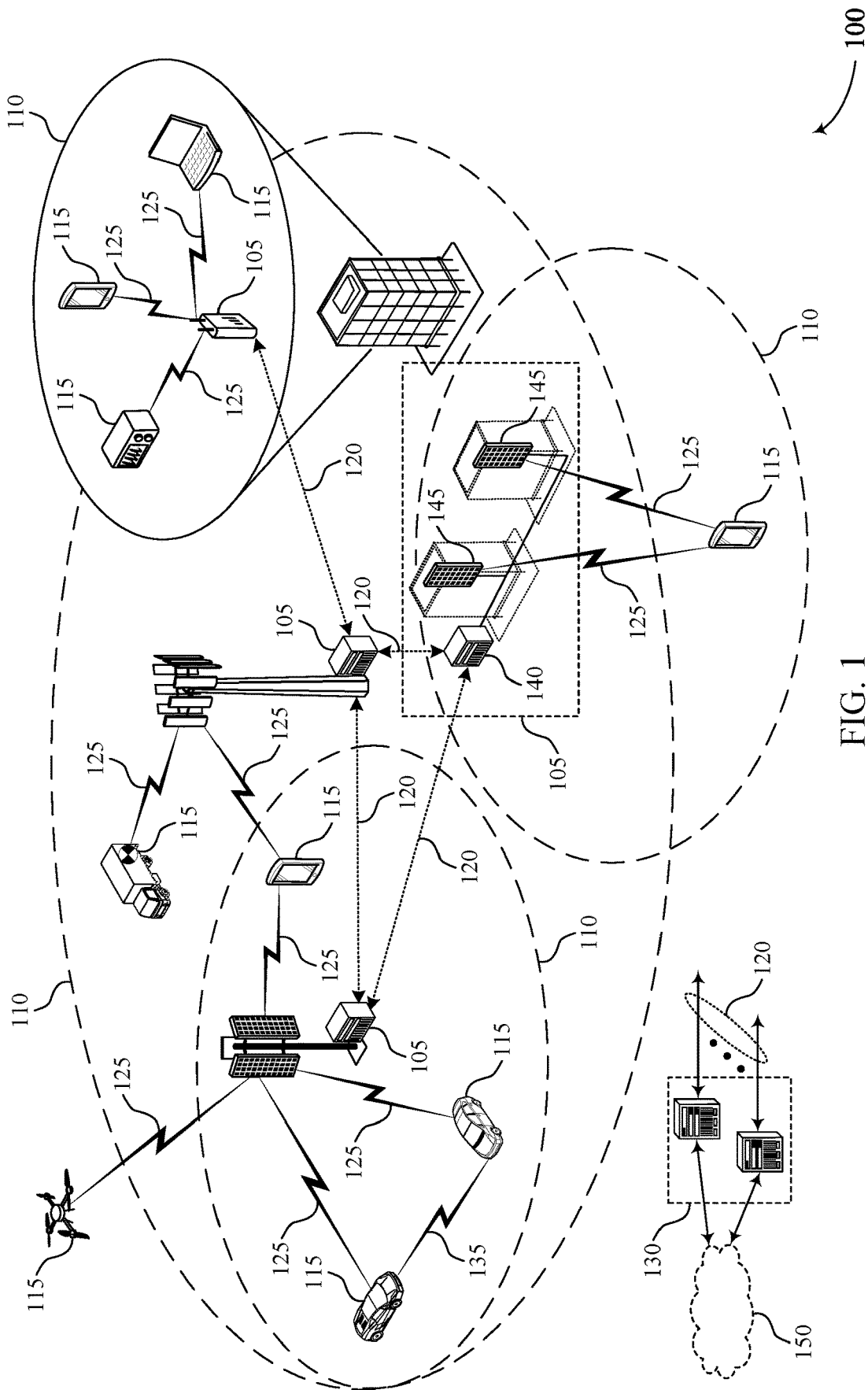
FIG. 1 illustrates an example of a wireless communications system that supports configuration and signaling techniques for scheduled wireless communications in accordance with aspects of the present disclosure.

In some wireless communications systems, a wireless device may communicate with one or more other wireless devices via a relay device. The relay device may receive a communication from a source device, and retransmit the communication to a destination device based on a relaying scheme that is configured at the devices. For example, a user equipment (UE) may communicate with a base station or another UE using a relay scheme in which communications are transmitted via one or more relay devices (e.g., relay UEs). In some cases, scheduled resource grants may be configured (e.g., semi-persistent scheduling (SPS) grants or configured grants (CGs)) in which a series of resources are provided for such communications such that a source device and relay device may have reliable resource allocations in which to transmit relayed communications.

In some cases, a relay device may receive communications from multiple different source devices, and such communications may have a same quality of service (QoS) or service type (e.g., ultra-reliable low latency communication (URLLC) data from multiple different source devices may need to be relayed). In such cases, the relay device may not know which of the multiple communications is to be transmitted ahead of other communications, and some source devices may be starved of relaying resources.

Various techniques described herein provide techniques for relaying communications from a source device via one or more relay devices, where scheduled resource grants may be used to provide resources for the relayed communications. In some cases, the scheduled resource grants (e.g., SPS grants, or CGs) may provide one or more associated relaying parameters for relayed communications. In some cases, a source device and relay device may use parameters to determine a relaying priority. Based on the relaying priority, the relay device, in cases where multiple communications from one or more source devices are to be relayed, may determine which communication has priority and transmit accordingly. In some cases, priorities may be defined per transmitted packet or transport block (TB), and multiple levels of priority may be defined. In some cases, relaying priority may be defined per configured scheduled resource grant configuration (e.g., a CG or SPS index may have an associated relaying priority), or per transmission occasion of the scheduled resource grants. Further, in some cases the relaying parameters may indicate a relaying type that is associated with scheduled resource grants, such as an amplify-and-forward (AF) relaying type, a decode-and-forward (DF) type, or a compress-and-forward (CF) type. In such cases, the relay device may determine the relaying type based on the configuration, or based on a configuration index that is mapped to a particular relaying type.

Additionally or alternatively, in various aspects one or more devices may employ energy harvesting (EH) from transmissions of a source device, and described techniques may provide for signaling of EH parameters for scheduled resource grants. The EH parameters may include, for example, time-switching (TS) energy harvesting parameters that configure a first subset of symbols for data and a second subset of symbols for EH (e.g., that may have higher power transmissions). In some cases, the EH parameters may include a splitting ratio for power-splitting (PS) EH, where power of a received signal is split between EH components and decoding components (e.g., for a −50 dBm total received power transmission, a 50/50 split would provide −53 dBm to EH components and −53 dBm to decoding components). In some cases, PS parameters may be provided as a fraction of received power (p) that goes to the EH components, with remaining power (1−ρ) provided to decoding components. In some cases, TS parameters may be provided as a starting symbol and symbol duration for EH symbols, or as a bitmap of EH and data symbols.

Particular aspects of the subject matter described herein may be implemented to realize one or more advantages. The described techniques may support improvements in relayed communications, in which multiple concurrent relayed communications may be prioritized at a relay device based on associated priorities. Such techniques may enhance reliability for communications, for example for supporting ultra-reliable low latency communications or other applications, by using scheduled resource grants that have associated priorities for transmissions ahead of other lower priority communications. Further, in some examples, the multiple relay configurations as described herein may support higher data rates, for control, data, or control and data, by providing reliable resources for communications across one or more relay paths in case of blocking or fading of one or more paths, thereby improving latency, reliability, or both. As such, supported techniques may include improved network operations, and, in some examples, may promote network efficiencies, among other benefits.

Aspects of the disclosure are initially described in the context of wireless communications systems. Examples of relaying configurations and related parameters and then discussed. Aspects of the disclosure are further illustrated by and described with reference to apparatus diagrams, system diagrams, and flowcharts that relate to configuration and signaling techniques for scheduled wireless communications.

FIG. 1 illustrates an example of a wireless communications system 100 that supports configuration and signaling techniques for scheduled wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, one or more base stations 105 or UEs 115 may act as a relay device for relaying communications from a source device (e.g., a source UE 115) to a destination device (e.g., a base station 105 or another UE 115). In some cases, scheduled resource grants may be used to provide resources for the relayed communications, and may provide one or more associated relaying parameters for relayed communications. A source device and relay device may use parameters to determine a relaying priority, and in cases where multiple communications received at the relay device that are to be relayed to a destination device, the relaying priority may be used to determine which resources are to be used to transmit each communication. Additionally or alternatively, scheduled resource grants may include EH parameters. The EH parameters may include, for example, time-switching EH parameters that configure a first subset of symbols for data and a second subset of symbols for EH, or power-splitting EH where power of a received signal is split between EH components and decoding components.

Figure 2:
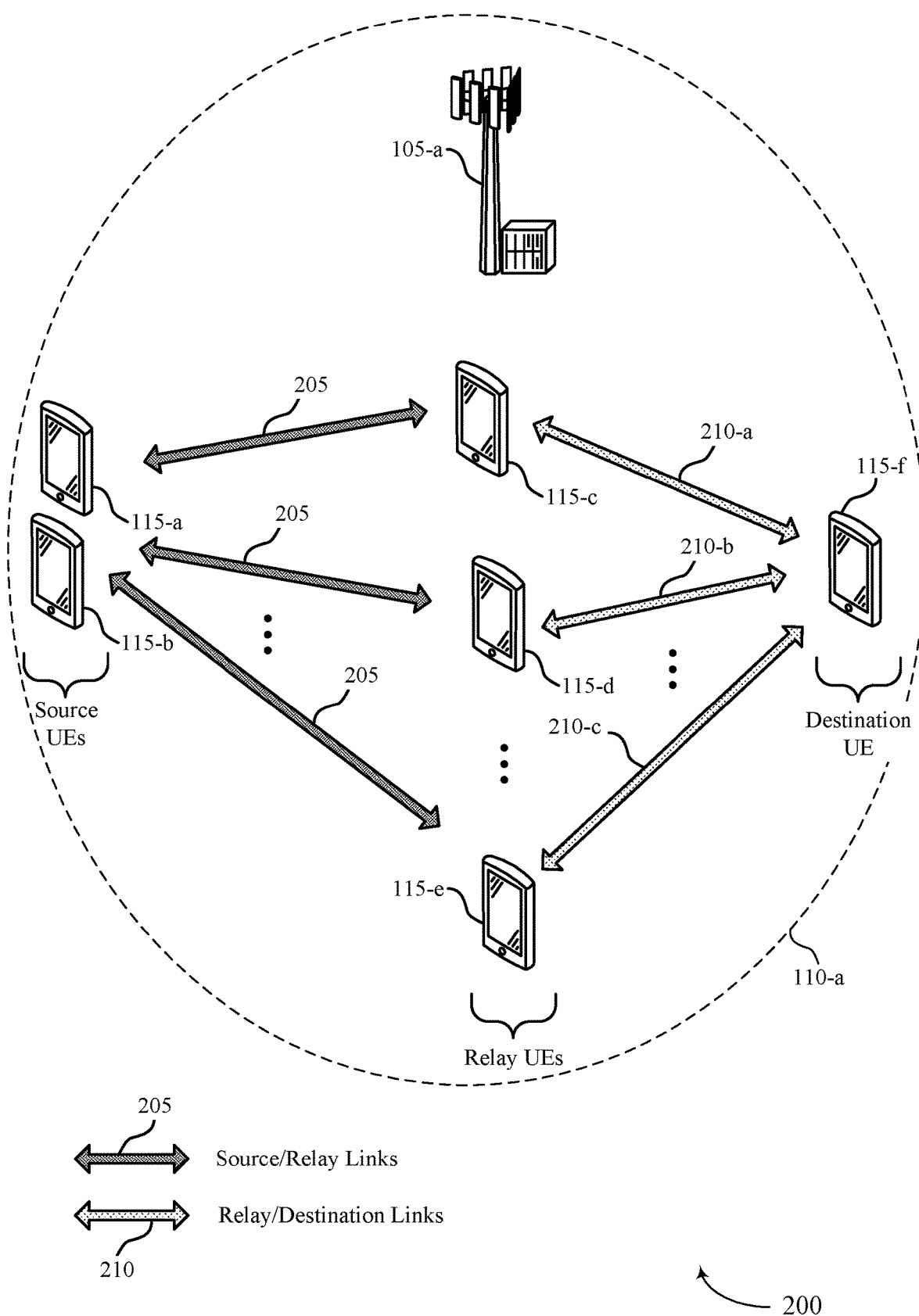
FIG. 2 illustrates an example of a portion of a wireless communications system that supports configuration and signaling techniques for scheduled wireless communications in accordance with aspects of the present disclosure.

FIG. 2 illustrates an example of a wireless communications system 200 that supports configuration and signaling techniques for scheduled wireless communications in accordance with aspects of the present disclosure. In some examples, wireless communications system 200 may implement aspects of wireless communications system 100. Wireless communications system 200 may include a base station 105-a (e.g., a base station 105 of FIG. 1) that may communicate with a number of UEs 115 (e.g., UEs 115 of FIG. 1) within coverage area 110-a. In some cases, the base station 105-a may configure resources for sidelink communications between the UEs 115, and the UEs 115 may communicate using the sidelink resources directly without the communications being transmitted to the base station 105-a. While the example of FIG. 2 discusses sidelink communications, techniques as discussed herein may be used in any communications that may use relaying based on scheduled resource grants, including sidelink communications, access link communications (e.g., Uu interface communications between a UE 115 and base station 105-a), integrated access and backhaul (IAB) or any combinations thereof.

In this example, UEs 115 in sidelink communications may use relaying techniques to enhance the reliability of communications. For example, one or multiple source UEs 115, including first source UE 115-a and second source UE 115-b, may transmit a source UE communication to a destination UE 115-f via a number of relay UEs 115-c through 115-e. In such relay communications, the source UEs 115-a and 115-b may use source/relay links 205 to transmit to the relay UEs 115-c through 115-e, which may use relay/destination links 210 to transmit to the destination UE 115-f. Additionally, while the example of FIG. 2 illustrates the destination as a destination UE 115-f, in other cases the destination may be base station 105-a, and relay techniques as discussed herein may provide improved reliability for communications between the base station 105-a and the source UEs 115-a and 115-b.

As discussed herein, in some cases, scheduled resource grants, such as SPS grants or CGs, may be used to provide consistent resources that may be used for relayed communications. For example, an SPS configuration may provide periodic resources with a periodicity p, which defines the time between two SPS occasions, and a parameter K1 which specifies an uplink control channel grant time in time slots for transmission of feedback (e.g., HARQ acknowledgment/negative-acknowledgment (ACK/NACK) feedback) after receiving a transmission in a SPS occasion. Such SPS grants may be configured, for example, by the base station 105-a using radio resource control (RRC) signaling, and a SPS configuration may be activated (or reactivated) based on control information that activates the configuration (e.g., in an activation downlink control information (DCI) transmission). The SPS activation may be released or deactivated based on subsequent control information (e.g., a SPS release DCI). Similar techniques may be used for CG activation, reactivation, and release. In some cases, the SPS activation control information may activate a certain configured SPS from multiple different SPS configurations. In some cases, the activation control information may indicate transmission parameters such as modulation and coding scheme (MCS), resource block (RB) allocation, antenna ports of the SPS transmission, or any combinations thereof, and a SPS reactivation may be used to change any of such parameters. In some cases, SPS or CG configurations may include control information related to relayed communications, energy harvesting, or both, which may allow for scheduled resource grant configurations that are provided per traffic flow to further maintain QoS and allow for enhanced performance, and also allow for reduced signaling per transmission.

In some cases, a scheduled resource grant configuration (e.g., that is provided in control information for a SPS or CG configuration) may provide a relaying priority. Such a relaying priority may provide for enhanced relaying operations, and each source UE 115-a and 115-b (or base station 105-a when the base station 105-a is a source) may have multiple packets or TBs to be sent to different UEs 115. Further, the source data may have a same set of QoS targets (e.g., latency and reliability targets). In some cases, priority associated with the scheduled resource grant configuration may allow for differentiation of such data and forwarding based on the associated prioritization. In some cases, a priority may be defined per relay packet or TB, and associated scheduled resource grants may be used to relay the packet or TB. In some cases, L levels of priority (e.g., where L>1) may be defined and associated with different grants of the scheduled resource grants. Additionally or alternatively, one or more EH parameters may be associated with the scheduled resource grants. Examples of relaying priority and EH parameters are discussed in more detail with reference to FIGS. 3 through 5.

Figure 3:
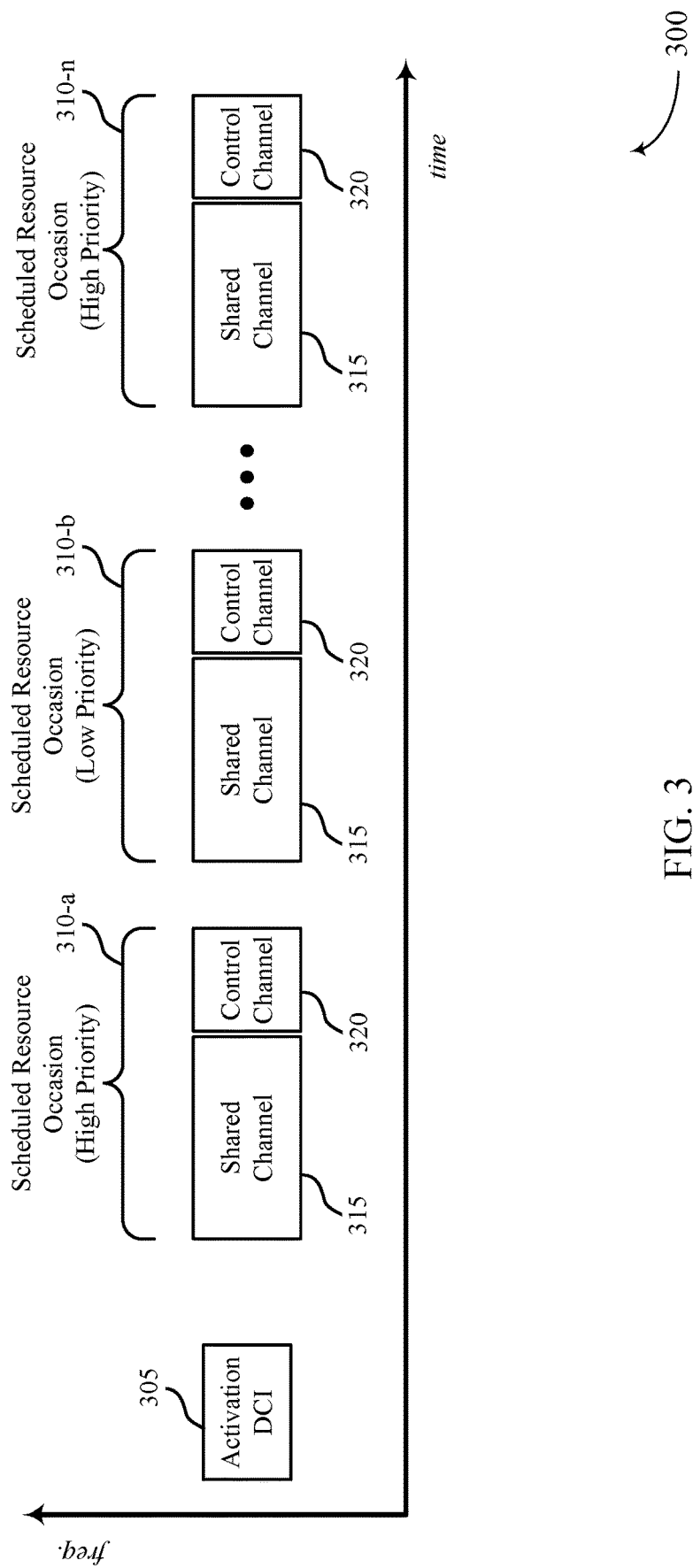
FIGS. 3 and 4 illustrate example of scheduled resource grants that support configuration and signaling techniques for scheduled wireless communications in accordance with aspects of the present disclosure.

FIG. 3 illustrates an example of a scheduled resource grants 300 that supports configuration and signaling techniques for scheduled wireless communications in accordance with aspects of the present disclosure. The scheduled resource grants 300 may implement various aspects of the wireless communications system 100 or 200 or may be implemented by various aspects of the wireless communications system 100 or 200, among other examples. For example, the scheduled resource grants 300 may be based on a configuration by a base station 105 and implemented by a UE 115.

In the example illustrated in FIG. 3, the scheduled resource grants 300 may be configured at one or more source devices, one or more relay devices, and one or more destination devices (e.g., by RRC signaling). The scheduled resources may be activated by activation DCI 305, which activates a number of scheduled resource occasions 310, illustrated in FIG. 3 as first scheduled resource occasion 310-a, second scheduled resource occasion 310-b, through nth scheduled resource occasion 310-n. Within each scheduled resource occasion, shared channel resources 315 and control channel resources 320 may be allocated. In this example, a relaying priority may be defined per scheduled resource occasion 310. For example, first scheduled resource occasion 310-a and nth scheduled resource occasion 310-n may provide resources for high priority communications, and the second scheduled resource occasion 310-b may provide resources for low priority communications. In some cases, the activation DCI 305 may provide an indication the relaying priority of each scheduled resource occasion 310. In other cases, multiple different configurations of scheduled resource grants may be provided, and each configuration is associated with a different relaying priority (e.g., each SPS index or CG index may have an associated relaying priority). An example of multiple scheduled resource grant configurations is illustrated in FIG. 4.

Figure 4:
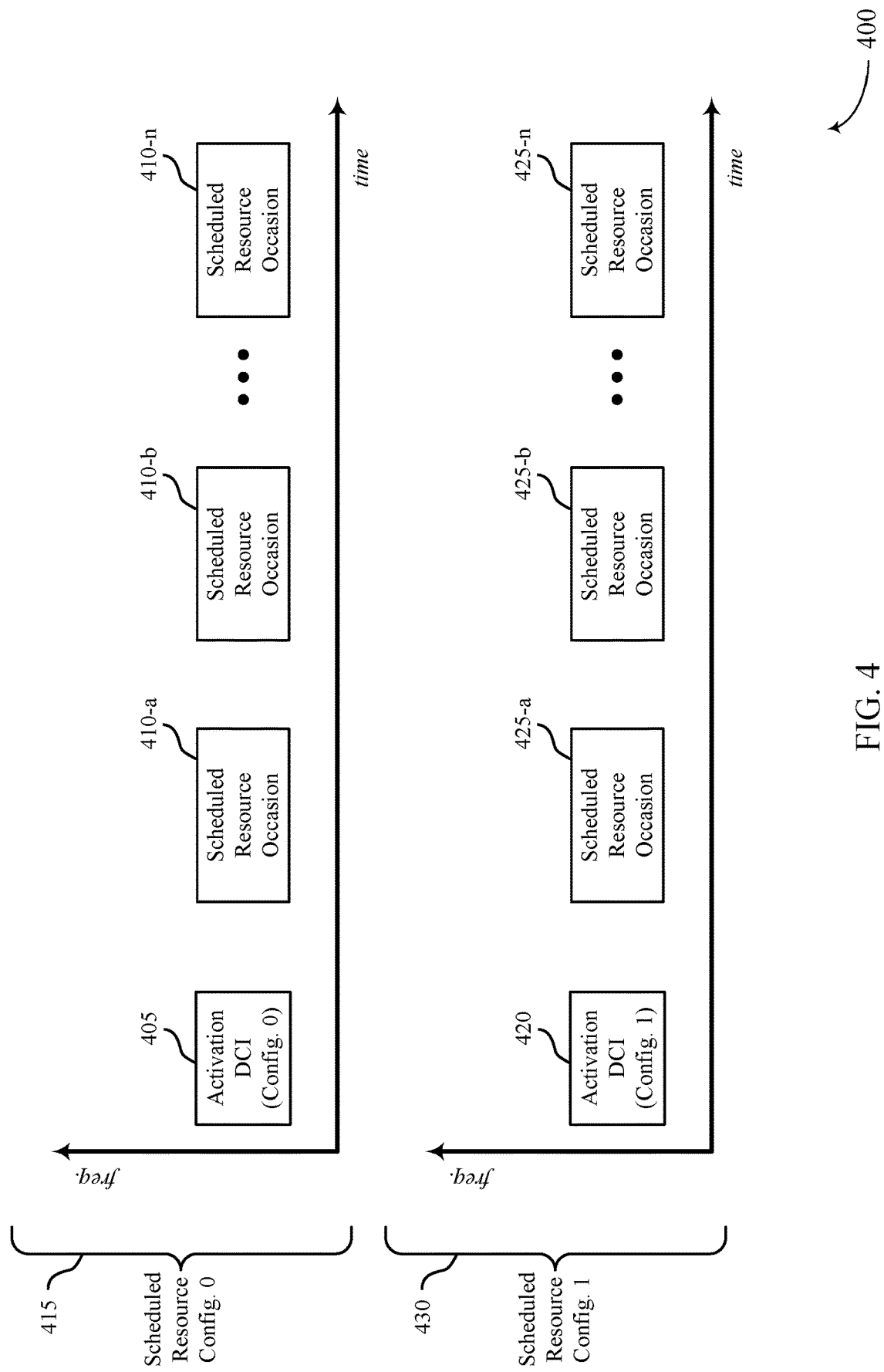

FIG. 4 illustrates another example of scheduled resource grants 400 that support configuration and signaling techniques for scheduled wireless communications in accordance with aspects of the present disclosure. The scheduled resource grants 400 may implement various aspects of the wireless communications system 100 or 200 or may be implemented by various aspects of the wireless communications system 100 or 200, among other examples. For example, the scheduled resource grants 400 may be based on a configuration by a base station 105 and implemented by a UE 115.

In the example illustrated in FIG. 4, a first scheduled resource grant configuration 415 (e.g., configuration index 0) may be provided with scheduled resource occasions 410 that are activated by activation DCI 405. Further, a second scheduled resource grant configuration 430 (e.g., configuration index 1) may be provided with scheduled resource occasions 425 that are activated by activation DCI 420. In some cases, the first scheduled resource grant configuration 415 may be associated with high priority relayed communications and the second scheduled resource grant configuration 430 may be associated with low priority relayed communications. A source device, may determine a priority for a transmission (e.g., based on a latency or reliability parameter associated with the transmission), and transmit using the corresponding scheduled resource grant configuration. Further, a relay device may receive the communication, and determine an associated priority for relaying based on whether it was received on the first scheduled resource grant configuration 415 or the second scheduled resource grant configuration 430.

Further, in some cases, relay devices may use different relaying types. For example, relaying types may include amplify-and-forward (AF) relaying, decode-and-forward (DF) relaying, and compress-and-forward (CF) relaying. In some cases, a relaying type may be an indication of complexity for the relaying device (e.g., processing resources needed at a relay UE, power consumption, and amount of digital operation) as well as QoS for the ongoing transmission (e.g., that is to be sent and received with high reliability). In some cases, different scheduled resource grant configurations may be associated with different relaying types.

For example, the first scheduled resource grant configuration 415 may indicate AF relaying, and the second scheduled resource grant configuration 430 may indicate DF relaying. In such examples, when relay devices relay data of the first scheduled resource grant configuration 415, AF relaying is used, and when relay devices relay data of the second scheduled resource grant configuration 430, DF relaying is used.

Figure 5:
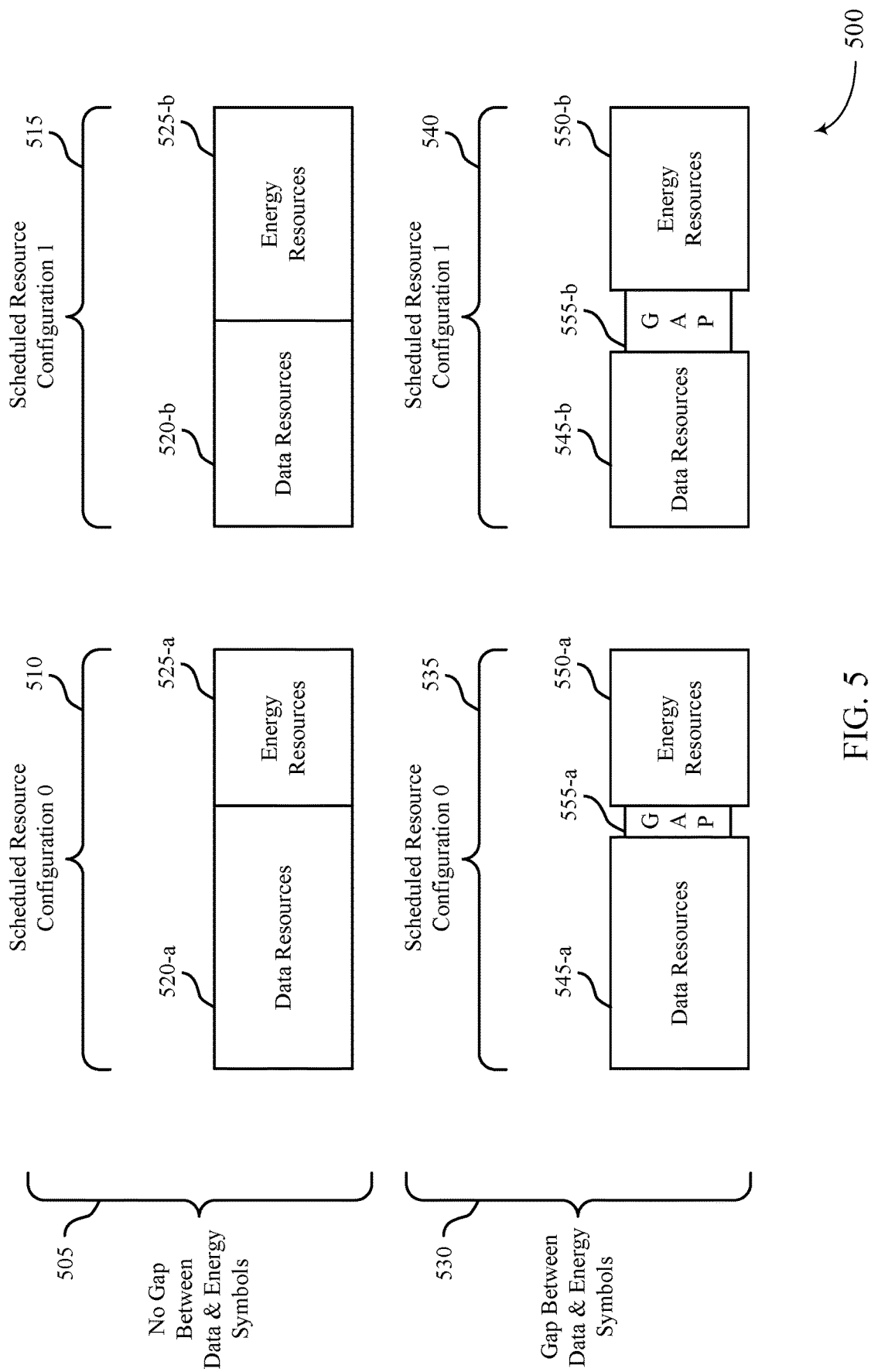
FIG. 5 illustrates an example of energy harvesting resources that support configuration and signaling techniques for scheduled wireless communications in accordance with aspects of the present disclosure.

FIG. 5 illustrates an example of energy harvesting resources 500 that support configuration and signaling techniques for scheduled wireless communications in accordance with aspects of the present disclosure. The energy harvesting resources 500 may implement various aspects of the wireless communications system 100 or 200 or may be implemented by various aspects of the wireless communications system 100 or 200, among other examples. For example, the energy harvesting resources 500 may be based on a configuration by a base station 105 and implemented by a UE 115.

As discussed herein, in some cases scheduled resource grant configurations may include one or more EH parameters. Such parameters may be used by some devices to obtain operating power from EH resources of scheduled resource grants. In some cases, devices that employ EH may be extreme low power or zero-energy devices (e.g., sensing devices for IoT applications that do not have a battery), where energy for such devices is obtained from ambient energy or radio waves. In some cases, providing energy to such devices using scheduled resource grants can provide relatively reliable power. Further, such EH scheduled resource grants may also transmit data, based on what type of EH is employed. In accordance with various aspects, scheduled resource grant configurations may provide one or more parameters that indicate resources for relaying and energy harvesting application.

In some cases, scheduled resource grant configurations may indicate one or more EH parameters that a receiving device for receiving communications, harvesting energy, or both. In some examples, time-switching (TS) EH may be implemented, and different scheduled resource grant configurations may indicate different TS parameters. In some cases, as indicated at examples 505, there may be no gap between data resources 520 and energy harvesting resources 525 (e.g., one or more symbols in which a higher transmit power may be used without modulation of information that is to be decoded). For example, a first scheduled resource grant configuration 510 (e.g., configuration index 0) may have a first number of symbols for data resources 520-*a*, and a second number of symbols for energy resources 525-*a*. A second scheduled resource grant configuration 515 (e.g., configuration index 1) may have a third number of symbols for data resources 520-*b*, and a fourth number of symbols for energy resources 525-*b*. In such examples, the particular EH parameters for communications may be indicated by the configuration index that is activated by an activation DCI.

In other examples, as indicated at examples 530, there may be a gap 555 (e.g., of one or more symbols to allow for switching of receive circuitry and components at a receiving device) between data resources 545 and energy resources 550. In examples 530, similarly as with examples 505, different scheduled resource grant configurations may indicate different TS parameters. For example, a first scheduled resource grant configuration 535 (e.g., configuration index 0) may have a first number of symbols for data resources 545-*a*, a first number gap 555-*a* symbols, and a first number of symbols for energy resources 550-*a*. A second scheduled resource grant configuration 540 (e.g., configuration index 1) may have a second number of symbols for data resources 545-*b*, a second number gap 555-*b* symbols, and a second number of symbols for energy resources 550-*b*. In such examples, the particular EH parameters for communications may be indicated by the configuration index that is activated by an activation DCI. In some cases, the scheduled resource grant configurations may include a bitmap for the symbols used for energy harvesting and those used for data in a downlink slot or TDD configuration. In other cases, symbols for EH may be indicated by a starting symbol and duration in a number of symbols.

While TS EH is illustrated in FIG. 5, in other cases power-splitting (PS) EH may be implemented. In a power-splitting architecture, received RF signals may be split into two streams, one for information that is provided to decoding components at the receiving device, and another for power that is provided to RF energy harvester components. The total received power may be split between the two streams with different power levels, where a power level ($\rho$) is provided to the RF energy harvester components and remaining power ($1-\rho$) is provided to the decoding components. In some cases, different scheduled resource grant configurations may be provided that have different PS power levels. For example, a first configuration index (e.g., index 0) may have $\rho_0$, and a second configuration index (e.g., index 1) may have $\rho_1$. In some cases, for either TS or PS EH parameters, a scheduled resource grant configuration may provide that the parameters may be changed in an activation or reactivation DCI.

Figure 6:
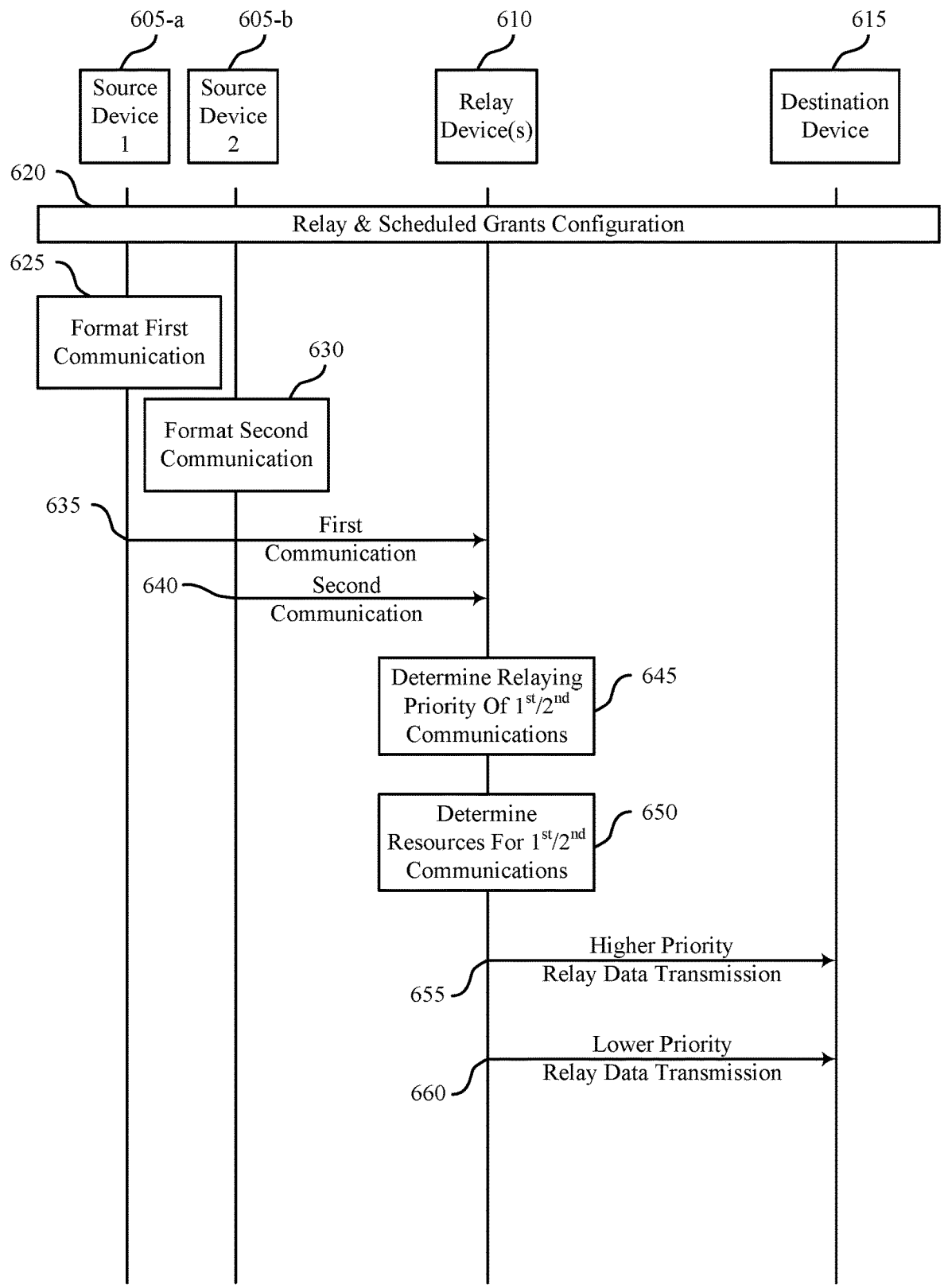
FIG. 6 illustrates an example of a process flow that supports configuration and signaling techniques for scheduled wireless communications in accordance with aspects of the present disclosure.

FIG. 6 illustrates an example of a process flow 600 that supports configuration and signaling techniques for scheduled wireless communications in accordance with aspects of the present disclosure. Process flow 600 may include multiple source devices 605, including a first source device 605-*a* (e.g., a source UE) and a second source device 605-*b*, a relay device 610 (e.g., or multiple relay devices such as one or more relay UEs), and a destination device 615 (e.g., a destination UE or base station), which may be examples of devices as described herein. In some cases, source devices 605, relay device 610, and destination device 615 communicate over a sidelink channel, an access channel, or combinations thereof. It is to be understood that any types of wireless nodes may act as the source, relay, and destination, and the techniques discussed herein apply to any such wireless nodes that may perform relayed communications via one or more relay nodes.

In the following description of the process flow 600, the operations between source devices 605, relay device 610, and destination devices 615, may be transmitted in a different order than the exemplary order shown, or the operations may be performed in different orders or at different times. Certain operations may also be left out of the process flow 600, or other operations may be added to the process flow 600.

At 620, the source devices 605, relay device 610, and destination device 615 may obtain relay and scheduled resource grant configuration. In some cases, a serving base station may configure relayed communications and provide one or more scheduled resource grant configurations that may be used for relayed communications. In some cases, a different device, such as one of the source devices 605 or the destination device 615, may provide one or more scheduled resource grant configurations that may be used for relayed communications. Further, in some cases, one or more parameters for the relayed communications, scheduled resource grant configurations, or both, may be provided in an activation or reactivation DCI that activates a scheduled resource grant configuration.

At 625, the first source device 605-a may format a first communication that is to be transmitted to the destination device 615 via relay device 610. In some cases, the first source device 605-a may determine a priority associated with the first communication, such as based on a type of service associated with the communication (e.g., a URLLC service or an enhanced mobile broadband (eMBB) service), one or more associated QoS targets, or any combinations thereof. In some cases, resources from the scheduled resource grant configuration may be identified based on the determined priority. In some cases, the first communication may be transmitted using scheduled resource grant configuration resources that are associated with the determined priority. In other cases, the first source device 605-a may provide an indication of the priority with the first communication (e.g., with packet or TB information that is provided per packet or TB).

At 630, the second source device 605-b may format a second communication that is to be transmitted to the destination device 615 via one or more relay device 610. In some cases, the second source device 605-b may also determine a priority associated with the second communication, and associated resources, similarly as described for the first source device 605-a.

At 635, the first source device 605-a may transmit the first communication to the relay device 610. At 640, the second source device 605-b may transmit the second communication to the relay device 610. The first communication and the second communication may be transmitted, in some cases, using resources of scheduled resource grants that are associated with the priority of the respective communications.

At 645, the relay device 610 may determine a relaying priority of the first communication and the second communication. In some cases, the relaying priority may be determined based on the resource that was used to transmit the respective communication. In some cases, each packet or TB of the first and second communication may have an associated priority. At 650, the relay device 610 may determine resources for the first and second communications. In some cases, the resources may be determined based on the identified priority associated with each communication. In some cases, different scheduled resource grant configurations may be configured for different priorities of communications, and used to determine the resources for the transmission of each communication. In other cases, the first and second communications may be ordered in resources for transmission to the destination device 615 based on the determined priority, such that higher priority communications are transmitted ahead of lower priority communications.

At 655 the relay device 610 may transmit the higher priority relay data transmission to the destination device 615, and at 660 the relay device 610 may transmit the lower priority relay data transmission to the destination device 615. In some cases, the transmissions to the destination device 615 may use scheduled resource grants that are associated with the identified priority. In other cases, transmissions to the destination device 615 may use dynamically scheduled resources or resources of a single scheduled resource grant, with the higher priority transmission transmitted in a transmission occasion that is prior to a later transmission occasion used to transmit the lower priority communication.

Figure 7:
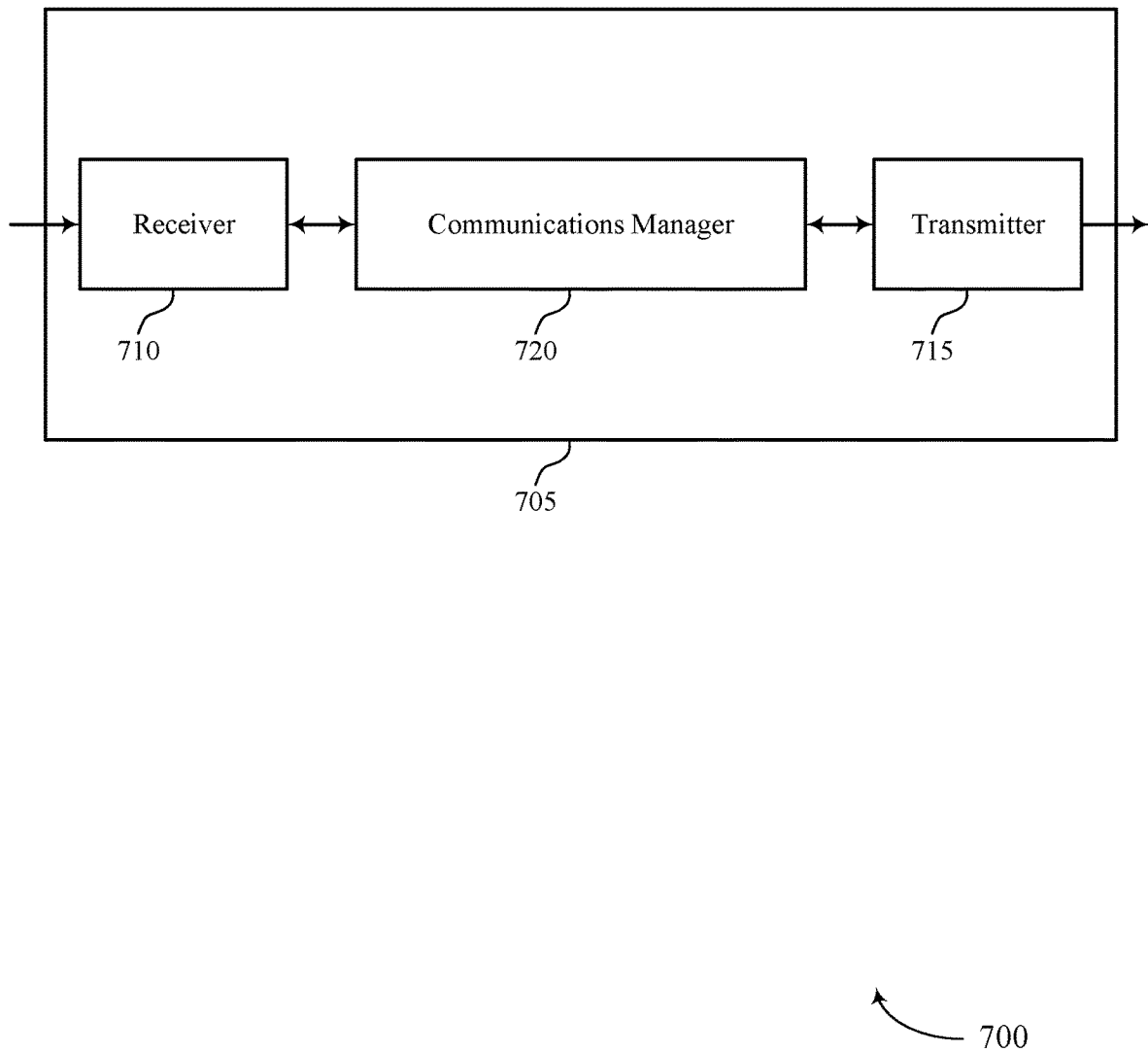
FIGS. 7 and 8 show block diagrams of devices that support configuration and signaling techniques for scheduled wireless communications in accordance with aspects of the present disclosure.

FIG. 7 shows a block diagram 700 of a device 705 that supports configuration and signaling techniques for scheduled wireless communications in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to configuration and signaling techniques for scheduled wireless communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to configuration and signaling techniques for scheduled wireless communications). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of configuration and signaling techniques for scheduled wireless communications as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first device in accordance with examples as disclosed herein. For example, the communications manager 720 may be configured as or otherwise support a means for receiving control signaling for scheduled resource grants for communications to one or more receiving devices, the control signaling identifying a first set of relay parameters for relayed communications that use a first set of multiple scheduled resource grants, and a second set of relay parameters for relayed communications that use a second set of multiple scheduled resource grants. The communications manager 720 may be configured as or otherwise support a means for determining that a first communication of two or more communications to be transmitted by the first device is a relayed communication for transmission using the first set of multiple scheduled resource grants, and that a second communication of the two or more communications is a relayed communication for transmission using the second set of multiple scheduled resource grants. The communications manager 720 may be configured as or otherwise support a means for transmitting the first communication based on the first set of relay parameters and the second communication based on the second set of relay parameters.

Additionally or alternatively, the communications manager 720 may support wireless communication at a receiving device in accordance with examples as disclosed herein. For example, the communications manager 720 may be configured as or otherwise support a means for receiving control signaling for a set of multiple scheduled resource grants from a transmitting device, the control signaling including one or more energy harvesting parameters that indicate a first portion of one or more of the set of multiple scheduled resource grants is for data communications and a second portion of the one or more of the set of multiple scheduled resource grants is for energy harvesting. The communications manager 720 may be configured as or otherwise support a means for receiving a first transmission of the set of multiple scheduled resource grants from the transmitting device. The communications manager 720 may be configured as or otherwise support a means for decoding information from the first portion of the first transmission according to the one or more energy harvesting parameters. The communications manager 720 may be configured as or otherwise support a means for harvesting energy from the second portion of the first transmission according to the one or more energy harvesting parameters.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for relayed communications, in which multiple concurrent relayed communications may be prioritized at a relay device based on associated priorities. Such techniques may enhance reliability for communications, may support higher data rates, for control, data, or control and data, provide reliable resources for communications across one or more relay paths in case of blocking or fading of one or more paths, and thereby improve latency, reliability, or both.

Figure 8:
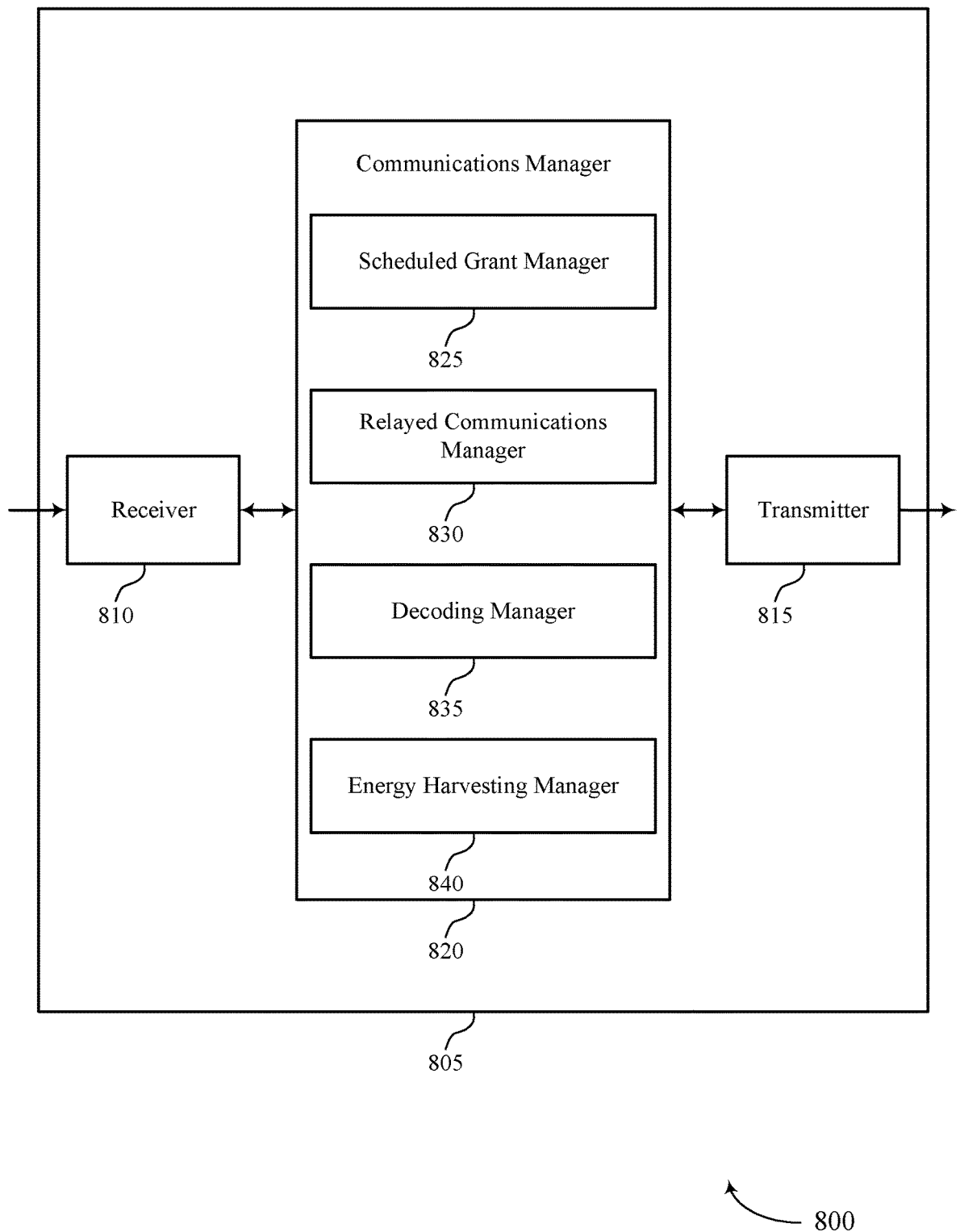

FIG. 8 shows a block diagram 800 of a device 805 that supports configuration and signaling techniques for scheduled wireless communications in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to configuration and signaling techniques for scheduled wireless communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to configuration and signaling techniques for scheduled wireless communications). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of configuration and signaling techniques for scheduled wireless communications as described herein. For example, the communications manager 820 may include a scheduled grant manager 825, a relayed communications manager 830, a decoding manager 835, an energy harvesting manager 840, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a first device in accordance with examples as disclosed herein. The scheduled grant manager 825 may be configured as or otherwise support a means for receiving control signaling for scheduled resource grants for communications to one or more receiving devices, the control signaling identifying a first set of relay parameters for relayed communications that use a first set of multiple scheduled resource grants, and a second set of relay parameters for relayed communications that use a second set of multiple scheduled resource grants. The relayed communications manager 830 may be configured as or otherwise support a means for determining that a first communication of two or more communications to be transmitted by the first device is a relayed communication for transmission using the first set of multiple scheduled resource grants, and that a second communication of the two or more communications is a relayed communication for transmission using the second set of multiple scheduled resource grants. The relayed communications manager 830 may be configured as or otherwise support a means for transmitting the first communication based on the first set of relay parameters and the second communication based on the second set of relay parameters.

Additionally or alternatively, the communications manager 820 may support wireless communication at a receiving device in accordance with examples as disclosed herein. The scheduled grant manager 825 may be configured as or otherwise support a means for receiving control signaling for a set of multiple scheduled resource grants from a transmitting device, the control signaling including one or more energy harvesting parameters that indicate a first portion of one or more of the set of multiple scheduled resource grants is for data communications and a second portion of the one or more of the set of multiple scheduled resource grants is for energy harvesting. The scheduled grant manager 825 may be configured as or otherwise support a means for receiving a first transmission of the set of multiple scheduled resource grants from the transmitting device. The decoding manager 835 may be configured as or otherwise support a means for decoding information from the first portion of the first transmission according to the one or more energy harvesting parameters. The energy harvesting manager 840 may be configured as or otherwise support a means for harvesting energy from the second portion of the first transmission according to the one or more energy harvesting parameters.

Figure 9:
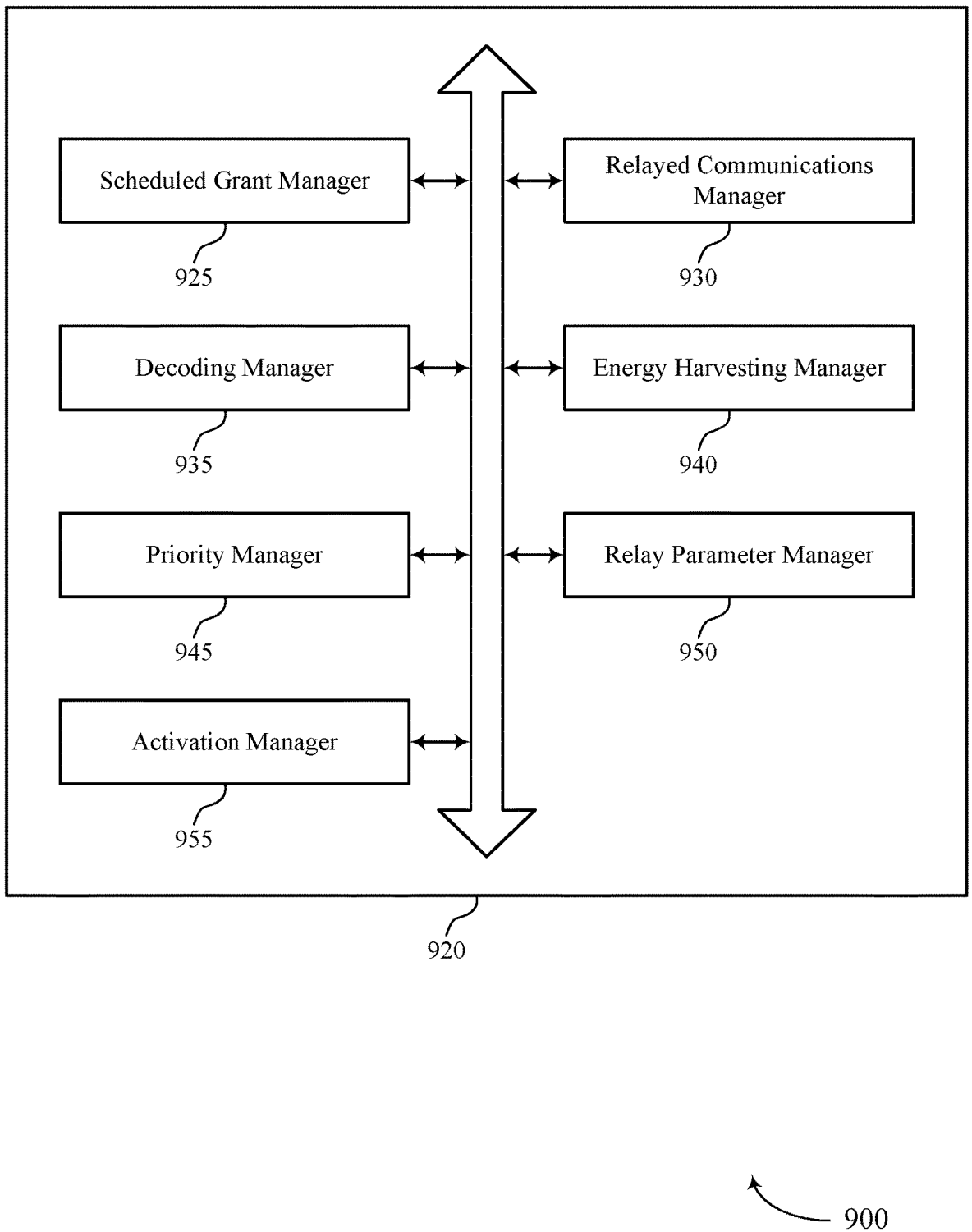
FIG. 9 shows a block diagram of a communications manager that supports configuration and signaling techniques for scheduled wireless communications in accordance with aspects of the present disclosure.

FIG. 9 shows a block diagram 900 of a communications manager 920 that supports configuration and signaling techniques for scheduled wireless communications in accordance with aspects of the present disclosure. The communications manager 920 may be an example of aspects of a communications manager 720, a communications manager 820, or both, as described herein. The communications manager 920, or various components thereof, may be an example of means for performing various aspects of configuration and signaling techniques for scheduled wireless communications as described herein. For example, the communications manager 920 may include a scheduled grant manager 925, a relayed communications manager 930, a decoding manager 935, an energy harvesting manager 940, a priority manager 945, a relay parameter manager 950, an activation manager 955, or any combination thereof. Each of these components may communicate, directly or indirectly, with one another (e.g., via one or more buses).

The communications manager 920 may support wireless communication at a first device in accordance with examples as disclosed herein. The scheduled grant manager 925 may be configured as or otherwise support a means for receiving control signaling for scheduled resource grants for communications to one or more receiving devices, the control signaling identifying a first set of relay parameters for relayed communications that use a first set of multiple scheduled resource grants, and a second set of relay parameters for relayed communications that use a second set of multiple scheduled resource grants. The relayed communications manager 930 may be configured as or otherwise support a means for determining that a first communication of two or more communications to be transmitted by the first device is a relayed communication for transmission using the first set of multiple scheduled resource grants, and that a second communication of the two or more communications is a relayed communication for transmission using the second set of multiple scheduled resource grants. In some examples, the relayed communications manager 930 may be configured as or otherwise support a means for transmitting the first communication based on the first set of relay parameters and the second communication based on the second set of relay parameters.

In some examples, the first set of relay parameters indicates a first priority associated with the first set of multiple scheduled resource grants and the second set of relay parameters indicates a second priority associated with the second set of multiple scheduled resource grants, and where communications with the first priority are transmitted ahead of communications with the second priority when relayed by the first device. In some examples, an indication of the first priority or the second priority is provided for each packet or transport block (TB) to be relayed by the first device. In some examples, the control signaling indicates the first priority and the second priority from two or more different available levels of priority.

In some examples, to support determining, the relayed communications manager 930 may be configured as or otherwise support a means for receiving, from one or more transmitting devices, the first communication and the second communication. In some examples, to support determining, the relayed communications manager 930 may be configured as or otherwise support a means for determining that the first communication has the first priority and that the second communication has the second priority, based on a priority indication associated with each of the first communication and the second communication.

In some examples, the first set of relay parameters is provided with a first configured grant that has an associated first priority, and the second set of relay parameters is provided with a second configured grant that has an associated second priority, and where communications with the first priority are transmitted ahead of communications with the second priority when relayed by the first device. In some examples, each configured grant has an index value, and each index value has an associated priority. In some examples, the first set of multiple scheduled resource grants use a first subset of a set of transmission occasions of a configured grant, and the second set of multiple scheduled resource grants use a second subset of the set of transmission occasions of the configured grant, and where the first subset of transmission occasions are used for communications with a first priority and the second subset of transmission occasions are used for communications with a second priority.

In some examples, the activation manager 955 may be configured as or otherwise support a means for receiving control information that activates the set of transmission occasions, and that indicates the first subset of transmission occasions and the second subset of transmission occasions. In some examples, the first set of relay parameters indicates a first relaying type for the first set of multiple scheduled resource grants, and the second set of relay parameters indicates a second relaying type for the second set of multiple scheduled resource grants. In some examples, the first relaying type and the second relaying type are selected from an AF relaying type, a DF relaying type, or a CF relaying type. In some examples, the first relaying type and the second relaying type are selected based on a quality of service associated with the first set of multiple scheduled resource grants and the second set of multiple scheduled resource grants.

Additionally or alternatively, the communications manager 920 may support wireless communication at a receiving device in accordance with examples as disclosed herein. In some examples, the scheduled grant manager 925 may be configured as or otherwise support a means for receiving control signaling for a set of multiple scheduled resource grants from a transmitting device, the control signaling including one or more energy harvesting parameters that indicate a first portion of one or more of the set of multiple scheduled resource grants is for data communications and a second portion of the one or more of the set of multiple scheduled resource grants is for energy harvesting. In some examples, the scheduled grant manager 925 may be configured as or otherwise support a means for receiving a first transmission of the set of multiple scheduled resource grants from the transmitting device. The decoding manager 935 may be configured as or otherwise support a means for decoding information from the first portion of the first transmission according to the one or more energy harvesting parameters. The energy harvesting manager 940 may be configured as or otherwise support a means for harvesting energy from the second portion of the first transmission according to the one or more energy harvesting parameters.

In some examples, the one or more energy harvesting parameters indicate a time-switching energy harvesting configuration or a power-splitting energy harvesting configuration. In some examples, to support receiving the control signaling, the energy harvesting manager 940 may be configured as or otherwise support a means for receiving first control signaling that indicates a first configuration index value that has a first energy harvesting configuration, and second control signaling that indicates a second configuration index value that has a second energy harvesting configuration, and where the first energy harvesting configuration and the second energy harvesting configuration each have different energy harvesting parameters.

In some examples, the one or more energy harvesting parameters provide time-switching energy harvesting parameters that indicate that the first portion is a first subset of symbols of the first transmission and the second portion is a second subset of symbols of the first transmission. In some examples, the first subset of symbols is indicated by a starting symbol and number of symbols, or is indicated by a bitmap. In some examples, the one or more energy harvesting parameters further provides a gap of one or more symbols between the first subset of symbols and the second subset of symbols. In some examples, the activation manager 955 may be configured as or otherwise support a means for receiving control information that activates the set of multiple scheduled resource grants and that indicates one or more of the energy harvesting parameters.

Figure 10:
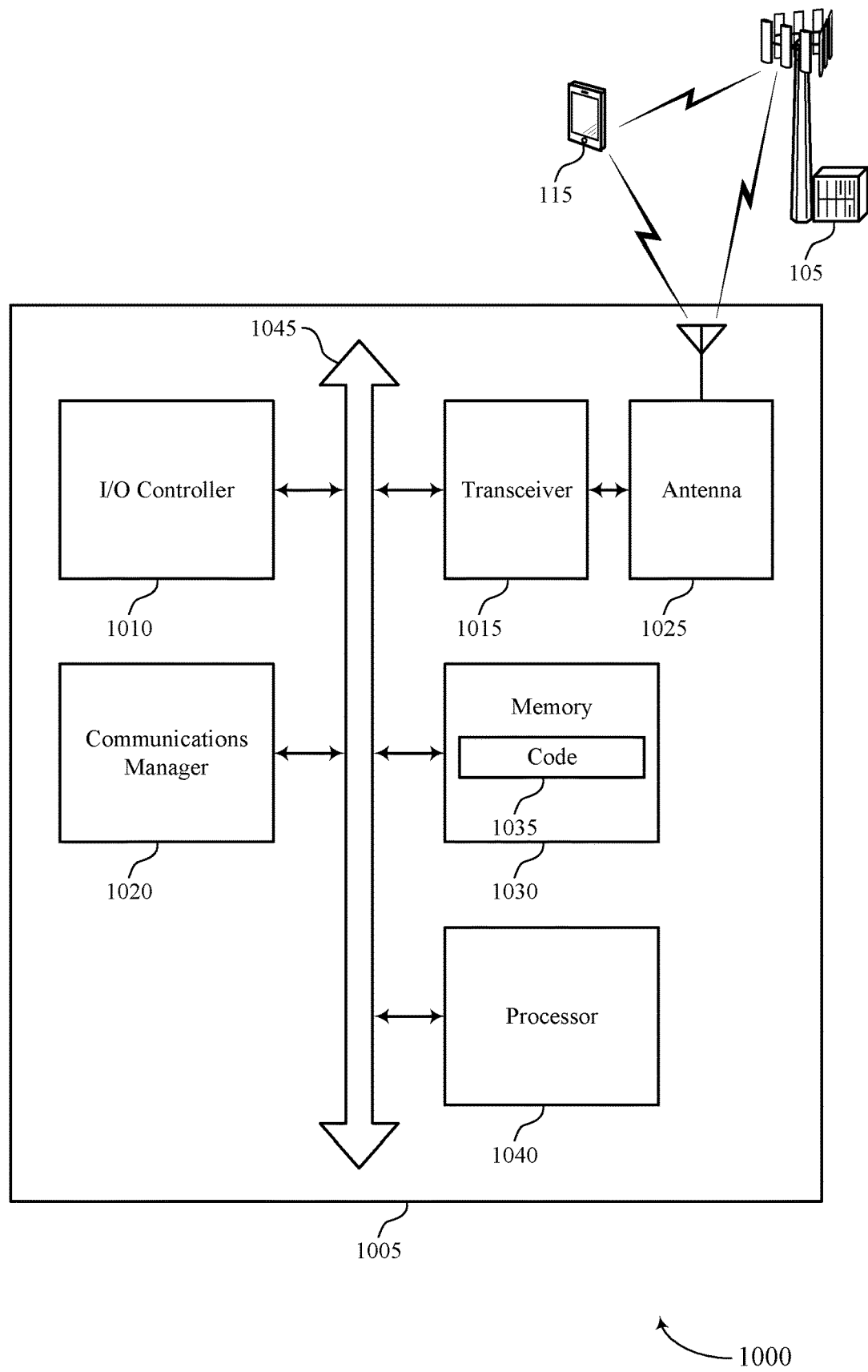
FIG. 10 shows a diagram of a system including a device that supports configuration and signaling techniques for scheduled wireless communications in accordance with aspects of the present disclosure.

FIG. 10 shows a diagram of a system 1000 including a device 1005 that supports configuration and signaling techniques for scheduled wireless communications in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting configuration and signaling techniques for scheduled wireless communications). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a first device in accordance with examples as disclosed herein. For example, the communications manager 1020 may be configured as or otherwise support a means for receiving control signaling for scheduled resource grants for communications to one or more receiving devices, the control signaling identifying a first set of relay parameters for relayed communications that use a first set of multiple scheduled resource grants, and a second set of relay parameters for relayed communications that use a second set of multiple scheduled resource grants. The communications manager 1020 may be configured as or otherwise support a means for determining that a first communication of two or more communications to be transmitted by the first device is a relayed communication for transmission using the first set of multiple scheduled resource grants, and that a second communication of the two or more communications is a relayed communication for transmission using the second set of multiple scheduled resource grants. The communications manager 1020 may be configured as or otherwise support a means for transmitting the first communication based on the first set of relay parameters and the second communication based on the second set of relay parameters.

Additionally or alternatively, the communications manager 1020 may support wireless communication at a receiving device in accordance with examples as disclosed herein. For example, the communications manager 1020 may be configured as or otherwise support a means for receiving control signaling for a set of multiple scheduled resource grants from a transmitting device, the control signaling including one or more energy harvesting parameters that indicate a first portion of one or more of the set of multiple scheduled resource grants is for data communications and a second portion of the one or more of the set of multiple scheduled resource grants is for energy harvesting. The communications manager 1020 may be configured as or otherwise support a means for receiving a first transmission of the set of multiple scheduled resource grants from the transmitting device. The communications manager 1020 may be configured as or otherwise support a means for decoding information from the first portion of the first transmission according to the one or more energy harvesting parameters. The communications manager 1020 may be configured as or otherwise support a means for harvesting energy from the second portion of the first transmission according to the one or more energy harvesting parameters.

By including or configuring the communications manager 1020 in accordance with examples as described herein, the device 1005 may support techniques for relayed communications, in which multiple concurrent relayed communications may be prioritized at a relay device based on associated priorities. Such techniques may enhance reliability for communications, may support higher data rates, for control, data, or control and data, provide reliable resources for communications across one or more relay paths in case of blocking or fading of one or more paths, and thereby improve latency, reliability, or both.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of configuration and signaling techniques for scheduled wireless communications as described herein, or the processor 1040 and the memory 1030 may be otherwise configured to perform or support such operations.

Figure 11:
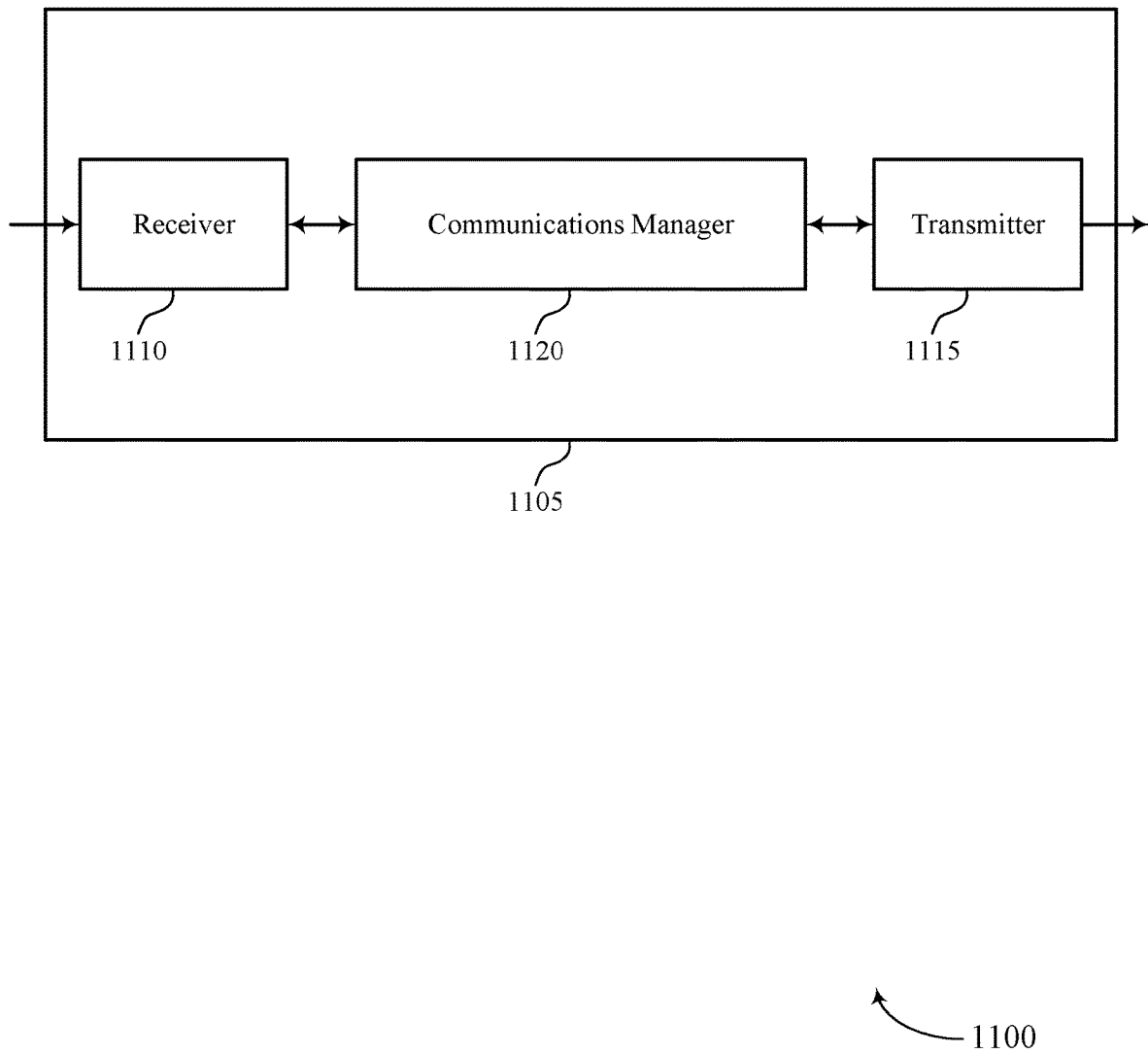
FIGS. 11 and 12 show block diagrams of devices that support configuration and signaling techniques for scheduled wireless communications in accordance with aspects of the present disclosure.

FIG. 11 shows a block diagram 1100 of a device 1105 that supports configuration and signaling techniques for scheduled wireless communications in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to configuration and signaling techniques for scheduled wireless communications). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to configuration and signaling techniques for scheduled wireless communications). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of configuration and signaling techniques for scheduled wireless communications as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a first device in accordance with examples as disclosed herein. For example, the communications manager 1120 may be configured as or otherwise support a means for receiving control signaling for scheduled resource grants for communications to one or more receiving devices, the control signaling identifying a first set of relay parameters for relayed communications that use a first set of multiple scheduled resource grants, and a second set of relay parameters for relayed communications that use a second set of multiple scheduled resource grants. The communications manager 1120 may be configured as or otherwise support a means for determining that a first communication of two or more communications to be transmitted by the first device is a relayed communication for transmission using the first set of multiple scheduled resource grants, and that a second communication of the two or more communications is a relayed communication for transmission using the second set of multiple scheduled resource grants. The communications manager 1120 may be configured as or otherwise support a means for transmitting the first communication based on the first set of relay parameters and the second communication based on the second set of relay parameters.

Additionally or alternatively, the communications manager 1120 may support wireless communications at a base station in accordance with examples as disclosed herein. For example, the communications manager 1120 may be configured as or otherwise support a means for transmitting control signaling for a set of multiple scheduled resource grants to a receiving device, the control signaling including one or more energy harvesting parameters that indicate a first portion of one or more of the set of multiple scheduled resource grants is for data communications and a second portion of the one or more of the set of multiple scheduled resource grants is for energy harvesting. The communications manager 1120 may be configured as or otherwise support a means for encoding information into the first portion of a first transmission according to the one or more energy harvesting parameters. The communications manager 1120 may be configured as or otherwise support a means for transmitting the first transmission of the set of multiple scheduled resource grants from the transmitting device, where the first portion of the first includes the encoded information and the second portion of the first transmission is transmitted using a transmit power that is selected to provide for efficient energy harvesting at the receiving device.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for relayed communications, in which multiple concurrent relayed communications may be prioritized at a relay device based on associated priorities. Such techniques may enhance reliability for communications, may support higher data rates, for control, data, or control and data, provide reliable resources for communications across one or more relay paths in case of blocking or fading of one or more paths, and thereby improve latency, reliability, or both.

Figure 12:
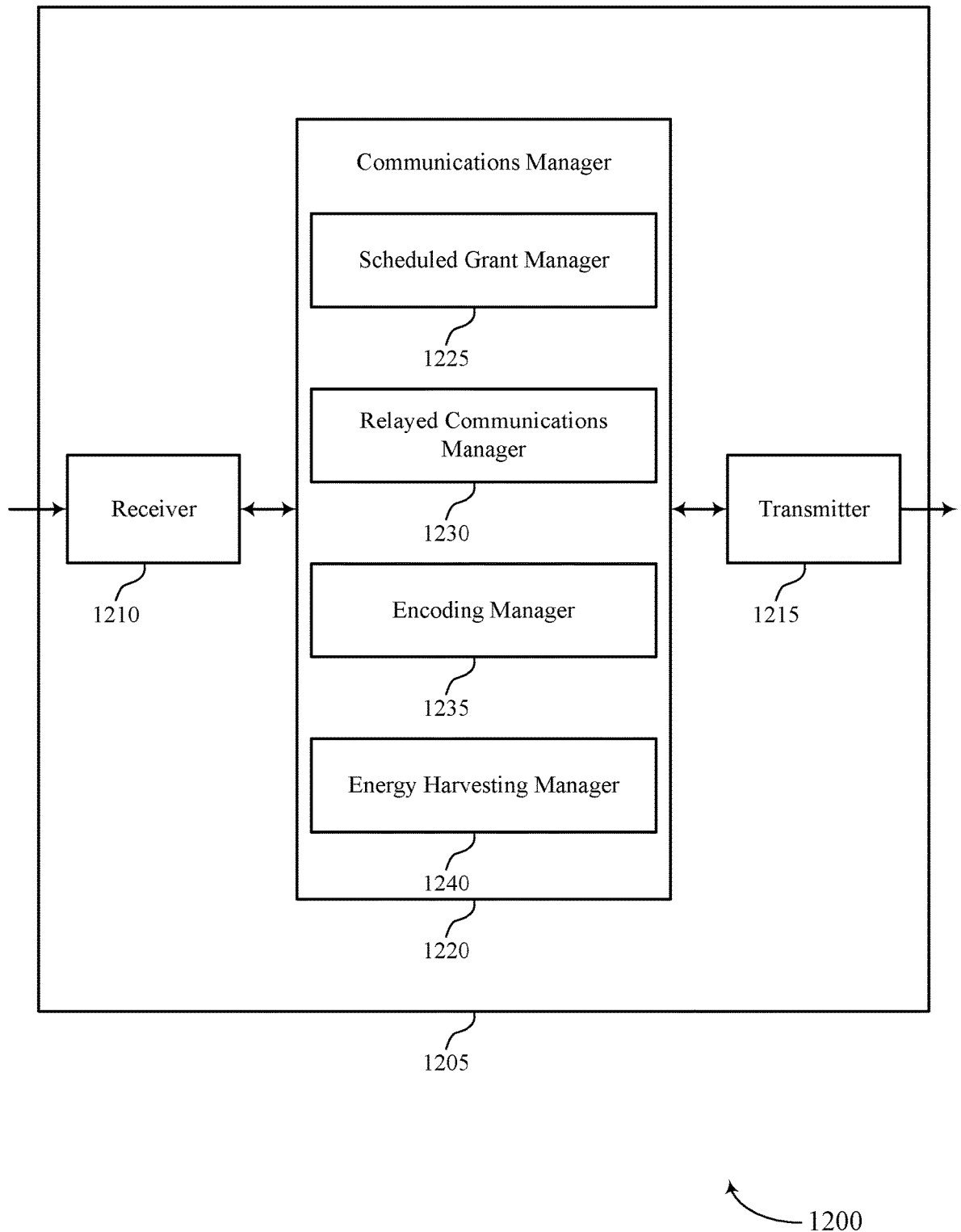

FIG. 12 shows a block diagram 1200 of a device 1205 that supports configuration and signaling techniques for scheduled wireless communications in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to configuration and signaling techniques for scheduled wireless communications). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to configuration and signaling techniques for scheduled wireless communications). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of configuration and signaling techniques for scheduled wireless communications as described herein. For example, the communications manager 1220 may include a scheduled grant manager 1225, a relayed communications manager 1230, an encoding manager 1235, an energy harvesting manager 1240, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a first device in accordance with examples as disclosed herein. The scheduled grant manager 1225 may be configured as or otherwise support a means for receiving control signaling for scheduled resource grants for communications to one or more receiving devices, the control signaling identifying a first set of relay parameters for relayed communications that use a first set of multiple scheduled resource grants, and a second set of relay parameters for relayed communications that use a second set of multiple scheduled resource grants. The relayed communications manager 1230 may be configured as or otherwise support a means for determining that a first communication of two or more communications to be transmitted by the first device is a relayed communication for transmission using the first set of multiple scheduled resource grants, and that a second communication of the two or more communications is a relayed communication for transmission using the second set of multiple scheduled resource grants. The relayed communications manager 1230 may be configured as or otherwise support a means for transmitting the first communication based on the first set of relay parameters and the second communication based on the second set of relay parameters.

Additionally or alternatively, the communications manager 1220 may support wireless communications at a base station in accordance with examples as disclosed herein. The scheduled grant manager 1225 may be configured as or otherwise support a means for transmitting control signaling for a set of multiple scheduled resource grants to a receiving device, the control signaling including one or more energy harvesting parameters that indicate a first portion of one or more of the set of multiple scheduled resource grants is for data communications and a second portion of the one or more of the set of multiple scheduled resource grants is for energy harvesting. The encoding manager 1235 may be configured as or otherwise support a means for encoding information into the first portion of a first transmission according to the one or more energy harvesting parameters. The energy harvesting manager 1240 may be configured as or otherwise support a means for transmitting the first transmission of the set of multiple scheduled resource grants from the transmitting device, where the first portion of the first includes the encoded information and the second portion of the first transmission is transmitted using a transmit power that is selected to provide for efficient energy harvesting at the receiving device.

Figure 13:
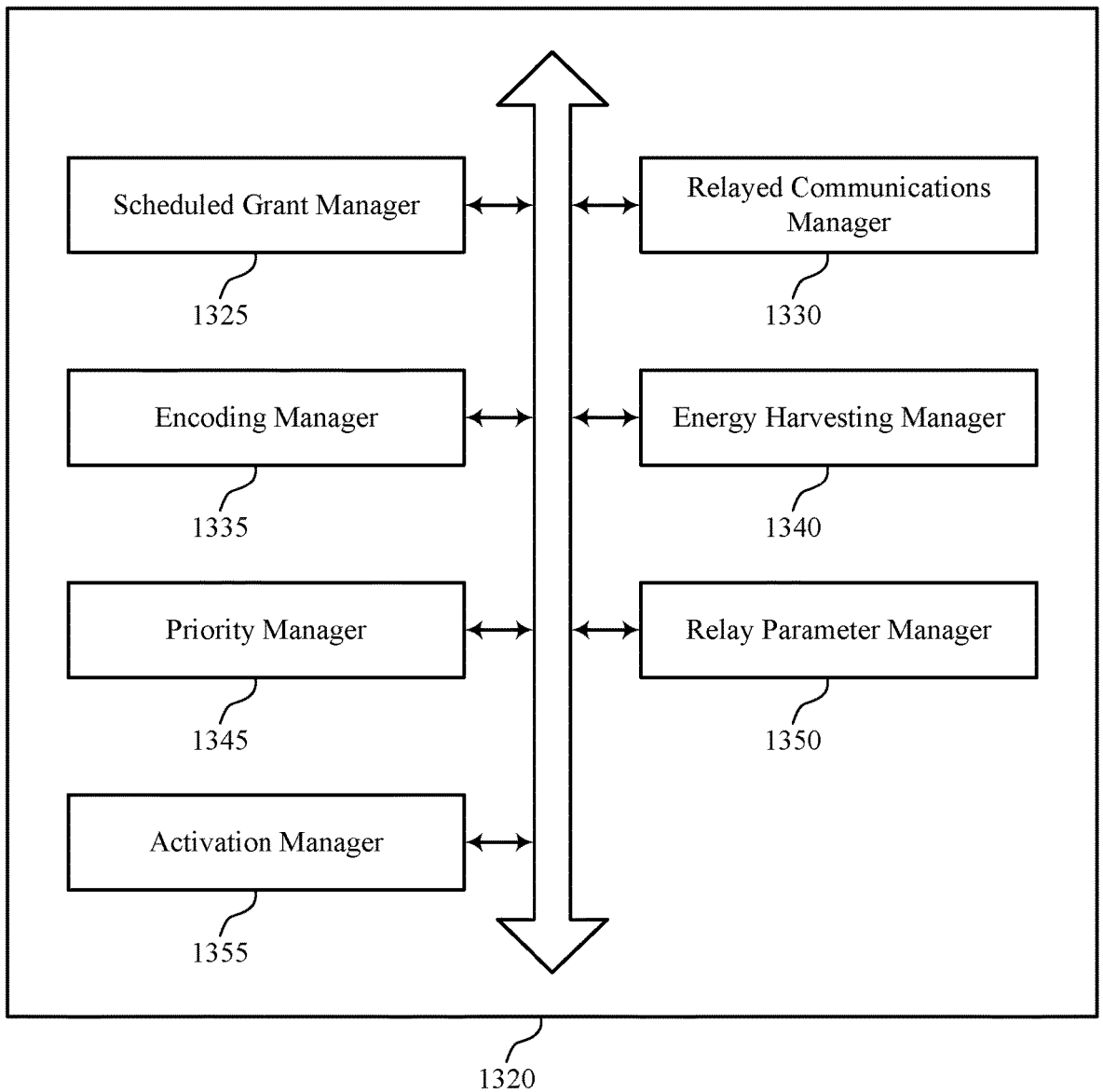
FIG. 13 shows a block diagram of a communications manager that supports configuration and signaling techniques for scheduled wireless communications in accordance with aspects of the present disclosure.

FIG. 13 shows a block diagram 1300 of a communications manager 1320 that supports configuration and signaling techniques for scheduled wireless communications in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of configuration and signaling techniques for scheduled wireless communications as described herein. For example, the communications manager 1320 may include a scheduled grant manager 1325, a relayed communications manager 1330, an encoding manager 1335, an energy harvesting manager 1340, a priority manager 1345, a relay parameter manager 1350, an activation manager 1355, or any combination thereof. Each of these components may communicate, directly or indirectly, with one another (e.g., via one or more buses).

The communications manager 1320 may support wireless communication at a first device in accordance with examples as disclosed herein. The scheduled grant manager 1325 may be configured as or otherwise support a means for receiving control signaling for scheduled resource grants for communications to one or more receiving devices, the control signaling identifying a first set of relay parameters for relayed communications that use a first set of multiple scheduled resource grants, and a second set of relay parameters for relayed communications that use a second set of multiple scheduled resource grants. The relayed communications manager 1330 may be configured as or otherwise support a means for determining that a first communication of two or more communications to be transmitted by the first device is a relayed communication for transmission using the first set of multiple scheduled resource grants, and that a second communication of the two or more communications is a relayed communication for transmission using the second set of multiple scheduled resource grants. In some examples, the relayed communications manager 1330 may be configured as or otherwise support a means for transmitting the first communication based on the first set of relay parameters and the second communication based on the second set of relay parameters.

In some examples, the first set of relay parameters indicates a first priority associated with the first set of multiple scheduled resource grants and the second set of relay parameters indicates a second priority associated with the second set of multiple scheduled resource grants, and where communications with the first priority are transmitted ahead of communications with the second priority when relayed by the first device. In some examples, an indication of the first priority or the second priority is provided for each packet or transport block (TB) to be relayed by the first device. In some examples, the control signaling indicates the first priority and the second priority from two or more different available levels of priority.

In some examples, to support determining, the relayed communications manager 1330 may be configured as or otherwise support a means for receiving, from one or more transmitting devices, the first communication and the second communication. In some examples, to support determining, the relayed communications manager 1330 may be configured as or otherwise support a means for determining that the first communication has the first priority and that the second communication has the second priority, based on a priority indication associated with each of the first communication and the second communication.

In some examples, the first set of relay parameters is provided with a first configured grant that has an associated first priority, and the second set of relay parameters is provided with a second configured grant that has an associated second priority, and where communications with the first priority are transmitted ahead of communications with the second priority when relayed by the first device. In some examples, each configured grant has an index value, and each index value has an associated priority. In some examples, the first set of multiple scheduled resource grants use a first subset of a set of transmission occasions of a configured grant, and the second set of multiple scheduled resource grants use a second subset of the set of transmission occasions of the configured grant, and where the first subset of transmission occasions are used for communications with a first priority and the second subset of transmission occasions are used for communications with a second priority.

In some examples, the activation manager 1355 may be configured as or otherwise support a means for receiving control information that activates the set of transmission occasions, and that indicates the first subset of transmission occasions and the second subset of transmission occasions. In some examples, the first set of relay parameters indicates a first relaying type for the first set of multiple scheduled resource grants, and the second set of relay parameters indicates a second relaying type for the second set of multiple scheduled resource grants. In some examples, the first relaying type and the second relaying type are selected from an AF relaying type, a DF relaying type, or a CF relaying type. In some examples, the first relaying type and the second relaying type are selected based on a quality of service associated with the first set of multiple scheduled resource grants and the second set of multiple scheduled resource grants.

Additionally or alternatively, the communications manager 1320 may support wireless communications at a base station in accordance with examples as disclosed herein. In some examples, the scheduled grant manager 1325 may be configured as or otherwise support a means for transmitting control signaling for a set of multiple scheduled resource grants to a receiving device, the control signaling including one or more energy harvesting parameters that indicate a first portion of one or more of the set of multiple scheduled resource grants is for data communications and a second portion of the one or more of the set of multiple scheduled resource grants is for energy harvesting. The encoding manager 1335 may be configured as or otherwise support a means for encoding information into the first portion of a first transmission according to the one or more energy harvesting parameters. The energy harvesting manager 1340 may be configured as or otherwise support a means for transmitting the first transmission of the set of multiple scheduled resource grants from the transmitting device, where the first portion of the first includes the encoded information and the second portion of the first transmission is transmitted using a transmit power that is selected to provide for efficient energy harvesting at the receiving device.

In some examples, the one or more energy harvesting parameters indicate a time-switching energy harvesting configuration or a power-splitting energy harvesting configuration. In some examples, the energy harvesting manager 1340 may be configured as or otherwise support a means for transmitting first control signaling that indicates a first configuration index value that has a first energy harvesting configuration, and second control signaling that indicates a second configuration index value that has a second energy harvesting configuration, and where the first energy harvesting configuration and the second energy harvesting configuration each have different energy harvesting parameters. In some examples, the one or more energy harvesting parameters provide time-switching energy harvesting parameters that indicate that the first portion is a first subset of symbols of the first transmission and the second portion is a second subset of symbols of the first transmission.

Figure 14:
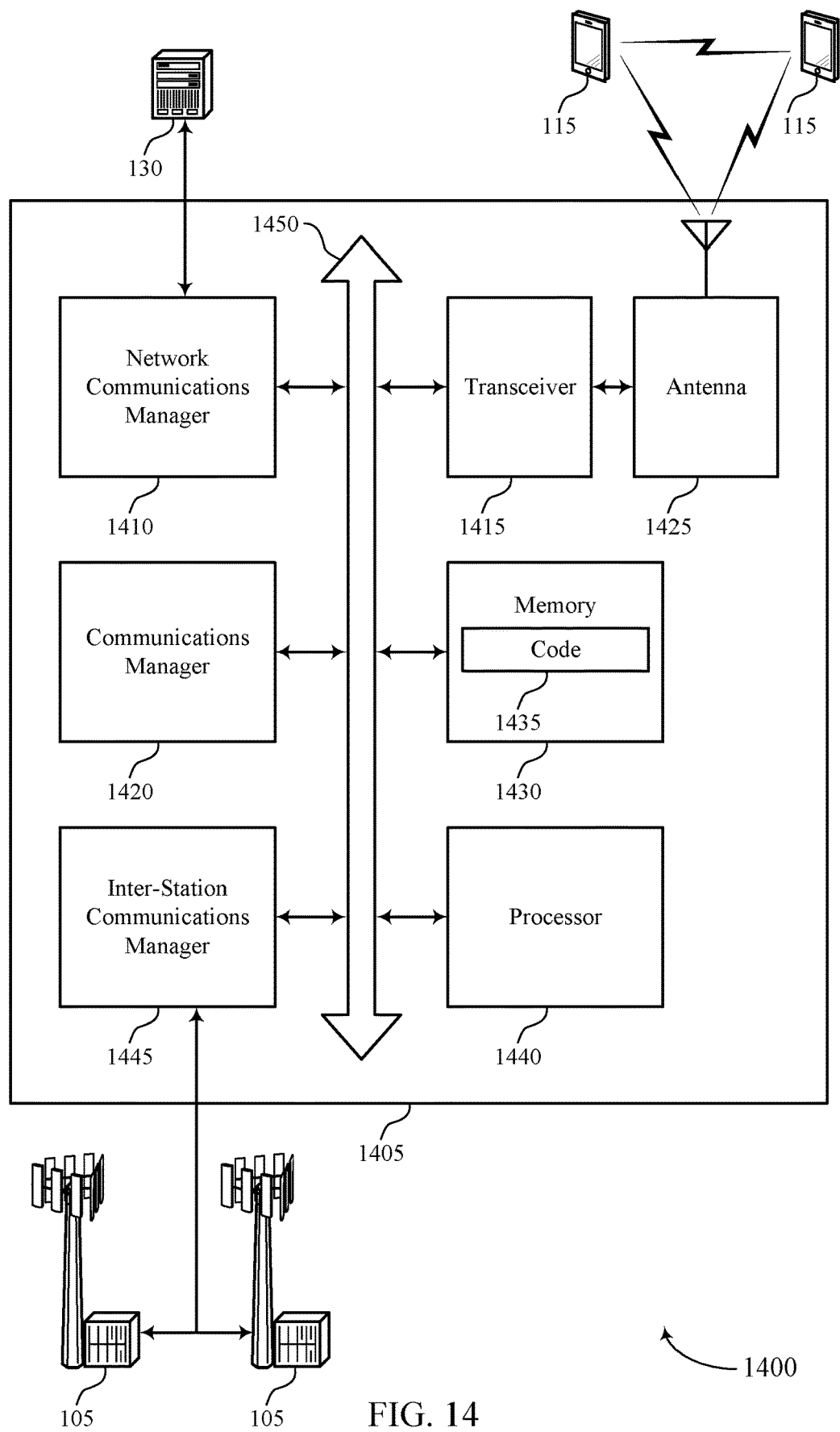
FIG. 14 shows a diagram of a system including a device that supports configuration and signaling techniques for scheduled wireless communications in accordance with aspects of the present disclosure.

FIG. 14 shows a diagram of a system 1400 including a device 1405 that supports configuration and signaling techniques for scheduled wireless communications in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting configuration and signaling techniques for scheduled wireless communications). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a first device in accordance with examples as disclosed herein. For example, the communications manager 1420 may be configured as or otherwise support a means for receiving control signaling for scheduled resource grants for communications to one or more receiving devices, the control signaling identifying a first set of relay parameters for relayed communications that use a first set of multiple scheduled resource grants, and a second set of relay parameters for relayed communications that use a second set of multiple scheduled resource grants. The communications manager 1420 may be configured as or otherwise support a means for determining that a first communication of two or more communications to be transmitted by the first device is a relayed communication for transmission using the first set of multiple scheduled resource grants, and that a second communication of the two or more communications is a relayed communication for transmission using the second set of multiple scheduled resource grants. The communications manager 1420 may be configured as or otherwise support a means for transmitting the first communication based on the first set of relay parameters and the second communication based on the second set of relay parameters.

Additionally or alternatively, the communications manager 1420 may support wireless communications at a base station in accordance with examples as disclosed herein. For example, the communications manager 1420 may be configured as or otherwise support a means for transmitting control signaling for a set of multiple scheduled resource grants to a receiving device, the control signaling including one or more energy harvesting parameters that indicate a first portion of one or more of the set of multiple scheduled resource grants is for data communications and a second portion of the one or more of the set of multiple scheduled resource grants is for energy harvesting. The communications manager 1420 may be configured as or otherwise support a means for encoding information into the first portion of a first transmission according to the one or more energy harvesting parameters. The communications manager 1420 may be configured as or otherwise support a means for transmitting the first transmission of the set of multiple scheduled resource grants from the transmitting device, where the first portion of the first includes the encoded information and the second portion of the first transmission is transmitted using a transmit power that is selected to provide for efficient energy harvesting at the receiving device.

By including or configuring the communications manager 1420 in accordance with examples as described herein, the device 1405 may support techniques for relayed communications, in which multiple concurrent relayed communications may be prioritized at a relay device based on associated priorities. Such techniques may enhance reliability for communications, may support higher data rates, for control, data, or control and data, provide reliable resources for communications across one or more relay paths in case of blocking or fading of one or more paths, and thereby improve latency, reliability, or both.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of configuration and signaling techniques for scheduled wireless communications as described herein, or the processor 1440 and the memory 1430 may be otherwise configured to perform or support such operations.

Figure 15:
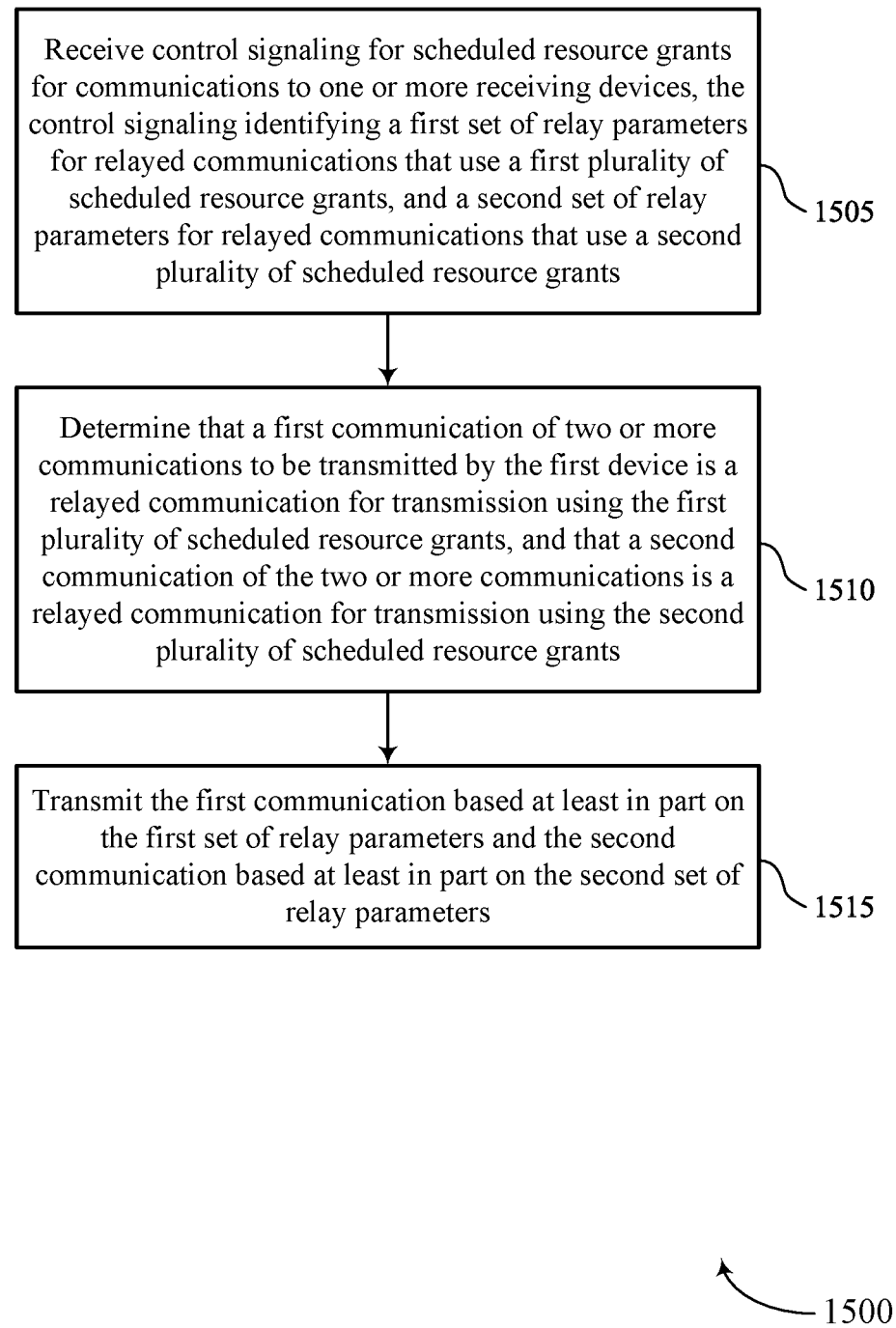
FIGS. 15 through 19 show flowcharts illustrating methods that support configuration and signaling techniques for scheduled wireless communications in accordance with aspects of the present disclosure.

FIG. 15 shows a flowchart illustrating a method 1500 that supports configuration and signaling techniques for scheduled wireless communications in accordance with aspects of the present disclosure. The operations of the method 1500 may be implemented by a UE or a base station or its components as described herein. For example, the operations of the method 1500 may be performed by a UE 115 as described with reference to FIGS. 1 through 10 or a base station 105 as described with reference to FIGS. 1 through 6 and 11 through 14. In some examples, a UE or a base station may execute a set of instructions to control the functional elements of the UE or the base station to perform the described functions. Additionally or alternatively, the UE or the base station may perform aspects of the described functions using special-purpose hardware.

At 1505, the method may include receiving control signaling for scheduled resource grants for communications to one or more receiving devices, the control signaling identifying a first set of relay parameters for relayed communications that use a first set of multiple scheduled resource grants, and a second set of relay parameters for relayed communications that use a second set of multiple scheduled resource grants. The operations of 1505 may be performed in accordance with examples as disclosed herein. In some examples, aspects of the operations of 1505 may be performed by a scheduled grant manager 925 or a scheduled grant manager 1325 as described with reference to FIGS. 9 and 13.

At 1510, the method may include determining that a first communication of two or more communications to be transmitted by the first device is a relayed communication for transmission using the first set of multiple scheduled resource grants, and that a second communication of the two or more communications is a relayed communication for transmission using the second set of multiple scheduled resource grants. The operations of 1510 may be performed in accordance with examples as disclosed herein. In some examples, aspects of the operations of 1510 may be performed by a relayed communications manager 930 or a relayed communications manager 1330 as described with reference to FIGS. 9 and 13.

At 1515, the method may include transmitting the first communication based on the first set of relay parameters and the second communication based on the second set of relay parameters. The operations of 1515 may be performed in accordance with examples as disclosed herein. In some examples, aspects of the operations of 1515 may be performed by a relayed communications manager 930 or a relayed communications manager 1330 as described with reference to FIGS. 9 and 13.

Figure 16:
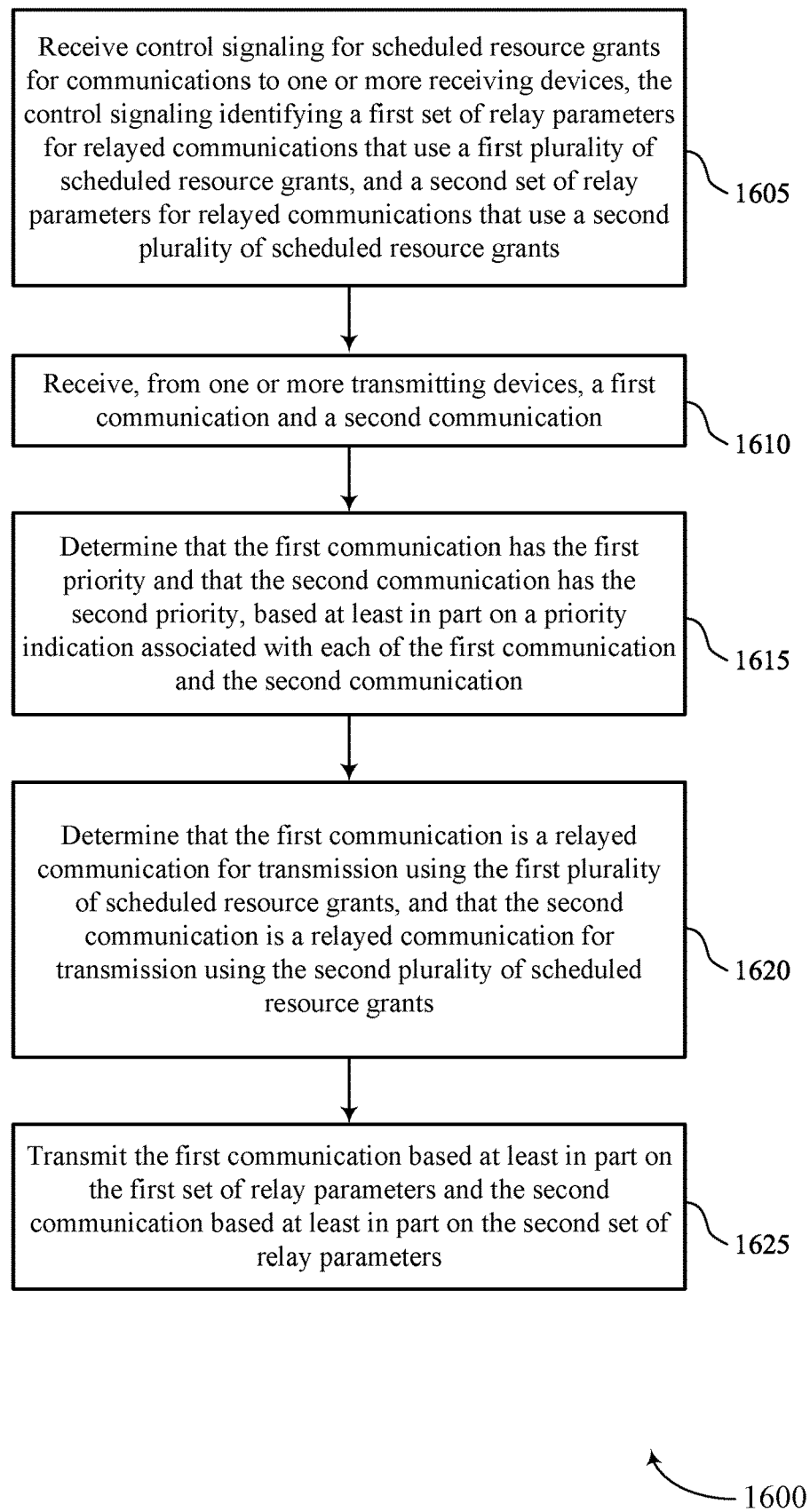

FIG. 16 shows a flowchart illustrating a method 1600 that supports configuration and signaling techniques for scheduled wireless communications in accordance with aspects of the present disclosure. The operations of the method 1600 may be implemented by a UE or a base station or its components as described herein. For example, the operations of the method 1600 may be performed by a UE 115 as described with reference to FIGS. 1 through 10 or a base station 105 as described with reference to FIGS. 1 through 6 and 11 through 14. In some examples, a UE or a base station may execute a set of instructions to control the functional elements of the UE or the base station to perform the described functions. Additionally or alternatively, the UE or the base station may perform aspects of the described functions using special-purpose hardware.

At 1605, the method may include receiving control signaling for scheduled resource grants for communications to one or more receiving devices, the control signaling identifying a first set of relay parameters for relayed communications that use a first set of multiple scheduled resource grants, and a second set of relay parameters for relayed communications that use a second set of multiple scheduled resource grants. The operations of 1605 may be performed in accordance with examples as disclosed herein. In some examples, aspects of the operations of 1605 may be performed by a scheduled grant manager 925 or a scheduled grant manager 1325 as described with reference to FIGS. 9 and 13. In some cases, the first set of relay parameters indicate a first priority associated with the first set of multiple scheduled resource grants and the second set of relay parameters indicate a second priority associated with the second set of multiple scheduled resource grants, and where communications with the first priority are transmitted ahead of communications with the second priority when relayed by the first device.

At 1610, the method may include receiving, from one or more transmitting devices, a first communication and a second communication. The operations of 1610 may be performed in accordance with examples as disclosed herein. In some examples, aspects of the operations of 1610 may be performed by a relayed communications manager 930 or a relayed communications manager 1330 as described with reference to FIGS. 9 and 13.

At 1615, the method may include determining that the first communication has the first priority and that the second communication has the second priority, based on a priority indication associated with each of the first communication and the second communication. The operations of 1615 may be performed in accordance with examples as disclosed herein. In some examples, aspects of the operations of 1615 may be performed by a relayed communications manager 930 or a relayed communications manager 1330 as described with reference to FIGS. 9 and 13.

At 1620, the method may include determining that the first communication is a relayed communication for transmission using the first set of multiple scheduled resource grants, and that the second communication is a relayed communication for transmission using the second set of multiple scheduled resource grants. The operations of 1620 may be performed in accordance with examples as disclosed herein. In some examples, aspects of the operations of 1620 may be performed by a relayed communications manager 930 or a relayed communications manager 1330 as described with reference to FIGS. 9 and 13.

At 1625, the method may include transmitting the first communication based on the first set of relay parameters and the second communication based on the second set of relay parameters. The operations of 1625 may be performed in accordance with examples as disclosed herein. In some examples, aspects of the operations of 1625 may be performed by a relayed communications manager 930 or a relayed communications manager 1330 as described with reference to FIGS. 9 and 13.

Figure 17:
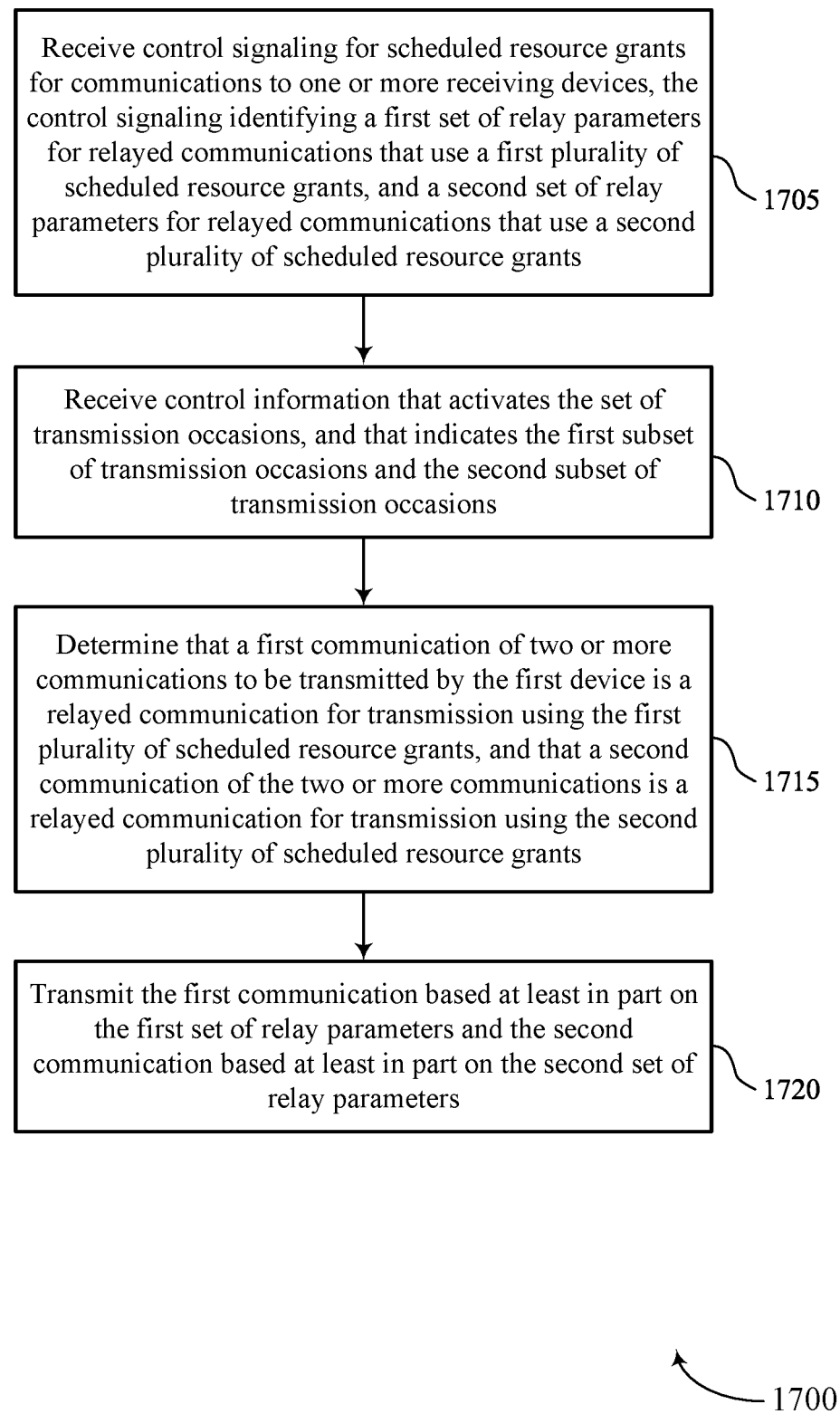

FIG. 17 shows a flowchart illustrating a method 1700 that supports configuration and signaling techniques for scheduled wireless communications in accordance with aspects of the present disclosure. The operations of the method 1700 may be implemented by a UE or a base station or its components as described herein. For example, the operations of the method 1700 may be performed by a UE 115 as described with reference to FIGS. 1 through 10 or a base station 105 as described with reference to FIGS. 1 through 6 and 11 through 14. In some examples, a UE or a base station may execute a set of instructions to control the functional elements of the UE or the base station to perform the described functions. Additionally or alternatively, the UE or the base station may perform aspects of the described functions using special-purpose hardware.

At 1705, the method may include receiving control signaling for scheduled resource grants for communications to one or more receiving devices, the control signaling identifying a first set of relay parameters for relayed communications that use a first set of multiple scheduled resource grants, and a second set of relay parameters for relayed communications that use a second set of multiple scheduled resource grants. The operations of 1705 may be performed in accordance with examples as disclosed herein. In some examples, aspects of the operations of 1705 may be performed by a scheduled grant manager 925 or a scheduled grant manager 1325 as described with reference to FIGS. 9 and 13. In some cases, the first set of multiple scheduling resource grants use a first subset of a set of transmission occasions of a configured grant, and the second set of multiple scheduled resource grants use a second subset of the set of transmission occasions of the configured grant, and where the first subset of transmission occasions are used for communications with a first priority and the second subset of transmission occasions are used for communications with a second priority.

At 1710, the method may include receiving control information that activates the set of transmission occasions, and that indicates the first subset of transmission occasions and the second subset of transmission occasions. The operations of 1710 may be performed in accordance with examples as disclosed herein. In some examples, aspects of the operations of 1710 may be performed by an activation manager 955 or an activation manager 1355 as described with reference to FIGS. 9 and 13.

At 1715, the method may include determining that a first communication of two or more communications to be transmitted by the first device is a relayed communication for transmission using the first set of multiple scheduled resource grants, and that a second communication of the two or more communications is a relayed communication for transmission using the second set of multiple scheduled resource grants. The operations of 1715 may be performed in accordance with examples as disclosed herein. In some examples, aspects of the operations of 1715 may be performed by a relayed communications manager 930 or a relayed communications manager 1330 as described with reference to FIGS. 9 and 13.

At 1720, the method may include transmitting the first communication based on the first set of relay parameters and the second communication based on the second set of relay parameters. The operations of 1720 may be performed in accordance with examples as disclosed herein. In some examples, aspects of the operations of 1720 may be performed by a relayed communications manager 930 or a relayed communications manager 1330 as described with reference to FIGS. 9 and 13.

Figure 18:
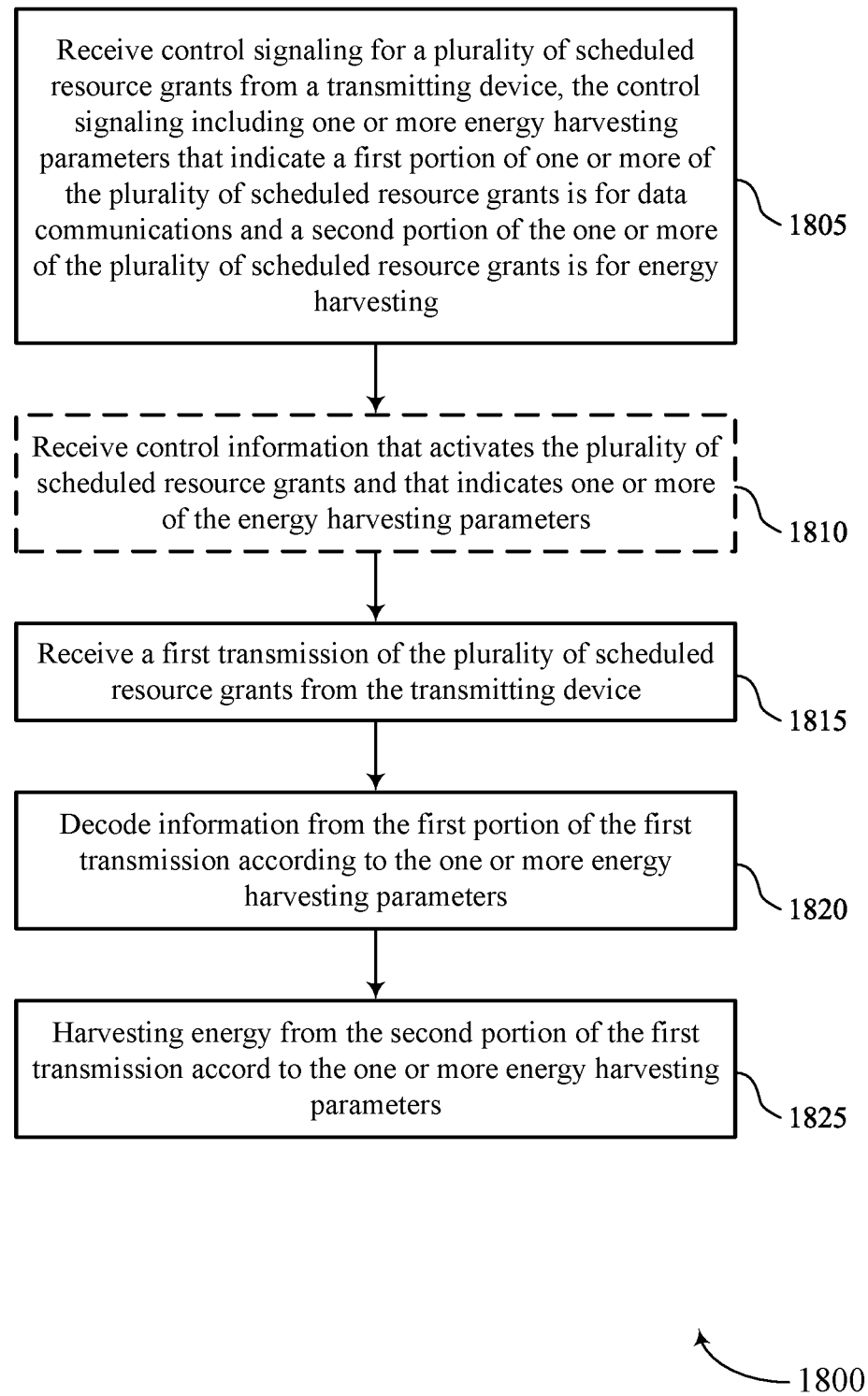

FIG. 18 shows a flowchart illustrating a method 1800 that supports configuration and signaling techniques for scheduled wireless communications in accordance with aspects of the present disclosure. The operations of the method 1800 may be implemented by a UE or its components as described herein. For example, the operations of the method 1800 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1805, the method may include receiving control signaling for a set of multiple scheduled resource grants from a transmitting device, the control signaling including one or more energy harvesting parameters that indicate a first portion of one or more of the set of multiple scheduled resource grants is for data communications and a second portion of the one or more of the set of multiple scheduled resource grants is for energy harvesting. The operations of 1805 may be performed in accordance with examples as disclosed herein. In some examples, aspects of the operations of 1805 may be performed by a scheduled grant manager 925 as described with reference to FIG. 9.

Optionally, at 1810, the method may include receiving control information that activates the set of multiple scheduled resource grants and that indicates one or more of the energy harvesting parameters. The operations of 1810 may be performed in accordance with examples as disclosed herein. In some examples, aspects of the operations of 1810 may be performed by an activation manager 955 as described with reference to FIG. 9.

At 1815, the method may include receiving a first transmission of the set of multiple scheduled resource grants from the transmitting device. The operations of 1815 may be performed in accordance with examples as disclosed herein. In some examples, aspects of the operations of 1815 may be performed by a scheduled grant manager 925 as described with reference to FIG. 9.

At 1820, the method may include decoding information from the first portion of the first transmission according to the one or more energy harvesting parameters. The operations of 1820 may be performed in accordance with examples as disclosed herein. In some examples, aspects of the operations of 1820 may be performed by a decoding manager 935 as described with reference to FIG. 9.

At 1825, the method may include harvesting energy from the second portion of the first transmission according to the one or more energy harvesting parameters. The operations of 1825 may be performed in accordance with examples as disclosed herein. In some examples, aspects of the operations of 1825 may be performed by an energy harvesting manager 940 as described with reference to FIG. 9.

Figure 19:
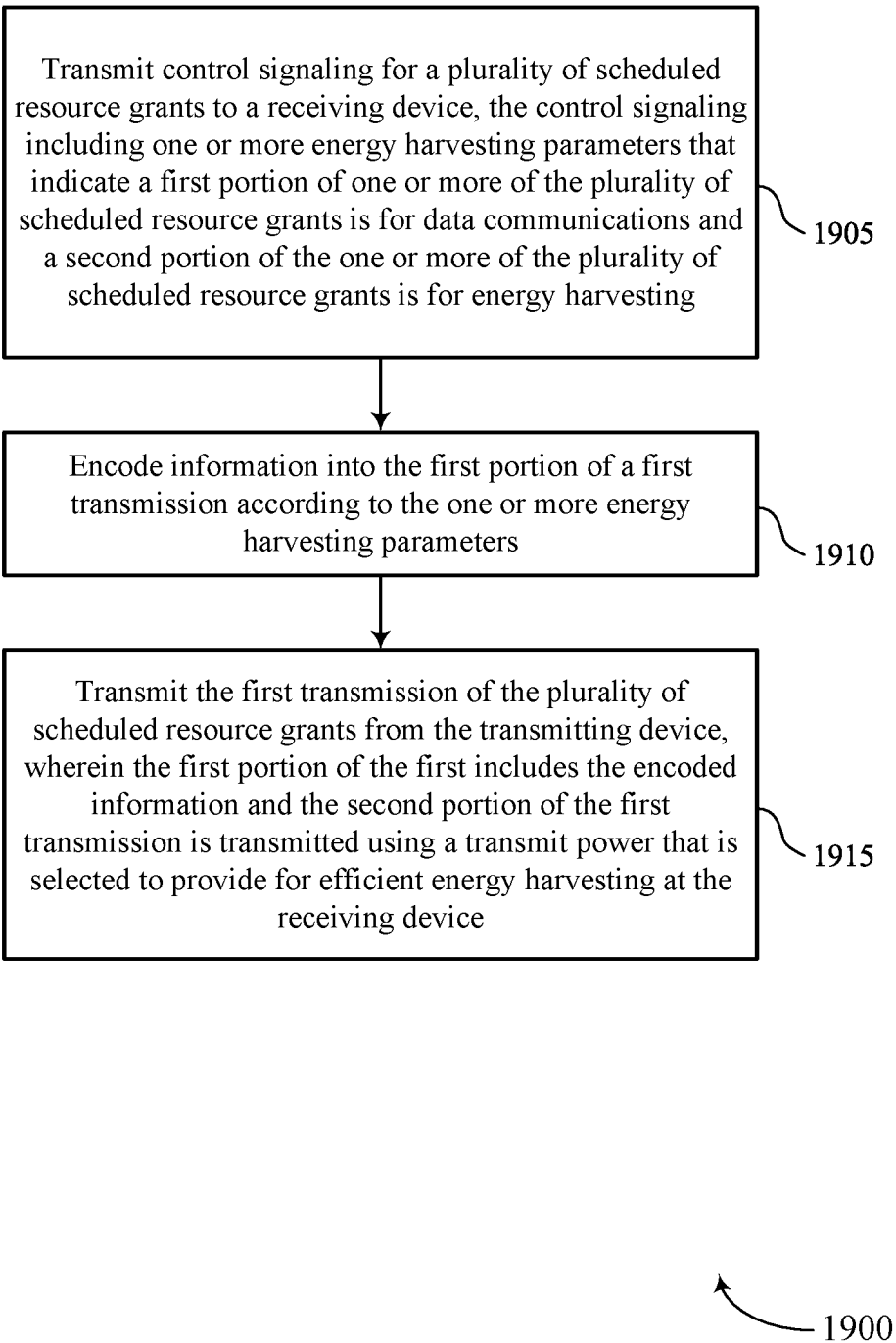

FIG. 19 shows a flowchart illustrating a method 1900 that supports configuration and signaling techniques for scheduled wireless communications in accordance with aspects of the present disclosure. The operations of the method 1900 may be implemented by a base station or its components as described herein. For example, the operations of the method 1900 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1905, the method may include transmitting control signaling for a set of multiple scheduled resource grants to a receiving device, the control signaling including one or more energy harvesting parameters that indicate a first portion of one or more of the set of multiple scheduled resource grants is for data communications and a second portion of the one or more of the set of multiple scheduled resource grants is for energy harvesting. The operations of 1905 may be performed in accordance with examples as disclosed herein. In some examples, aspects of the operations of 1905 may be performed by a scheduled grant manager 1325 as described with reference to FIG. 13.

At 1910, the method may include encoding information into the first portion of a first transmission according to the one or more energy harvesting parameters. The operations of 1910 may be performed in accordance with examples as disclosed herein. In some examples, aspects of the operations of 1910 may be performed by an encoding manager 1335 as described with reference to FIG. 13.

At 1915, the method may include transmitting the first transmission of the set of multiple scheduled resource grants from the transmitting device, where the first portion of the first includes the encoded information and the second portion of the first transmission is transmitted using a transmit power that is selected to provide for efficient energy harvesting at the receiving device. The operations of 1915 may be performed in accordance with examples as disclosed herein. In some examples, aspects of the operations of 1915 may be performed by an energy harvesting manager 1340 as described with reference to FIG. 13.

The following provides an overview of aspects of the present disclosure:

Aspect 1: A method for wireless communication at a first device, comprising: receiving control signaling for scheduled resource grants for communications to one or more receiving devices, the control signaling identifying a first set of relay parameters for relayed communications that use a first plurality of scheduled resource grants, and a second set of relay parameters for relayed communications that use a second plurality of scheduled resource grants; determining that a first communication of two or more communications to be transmitted by the first device is a relayed communication for transmission using the first plurality of scheduled resource grants, and that a second communication of the two or more communications is a relayed communication for transmission using the second plurality of scheduled resource grants; and transmitting the first communication based at least in part on the first set of relay parameters and the second communication based at least in part on the second set of relay parameters.

Aspect 2: The method of aspect 1, wherein the first set of relay parameters indicates a first priority associated with the first plurality of scheduled resource grants and the second set of relay parameters indicates a second priority associated with the second plurality of scheduled resource grants, and wherein communications with the first priority are transmitted ahead of communications with the second priority when relayed by the first device.

Aspect 3: The method of aspect 2, wherein an indication of the first priority or the second priority is provided for each packet or transport block (TB) to be relayed by the first device.

Aspect 4: The method of any of aspects 2 through 3, wherein the control signaling indicates the first priority and the second priority from two or more different available levels of priority.

Aspect 5: The method of any of aspects 2 through 4, wherein the determining comprises: receiving, from one or more transmitting devices, the first communication and the second communication; determining that the first communication has the first priority and that the second communication has the second priority, based at least in part on a priority indication associated with each of the first communication and the second communication.

Aspect 6: The method of any of aspects 1 through 5, wherein the first set of relay parameters is provided with a first configured grant that has an associated first priority, and the second set of relay parameters is provided with a second configured grant that has an associated second priority, and wherein communications with the first priority are transmitted ahead of communications with the second priority when relayed by the first device.

Aspect 7: The method of aspect 6, wherein each configured grant has an index value, and each index value has an associated priority.

Aspect 8: The method of any of aspects 1 through 7, wherein the first plurality of scheduled resource grants use a first subset of a set of transmission occasions of a configured grant, and the second plurality of scheduled resource grants use a second subset of the set of transmission occasions of the configured grant, and wherein the first subset of transmission occasions are used for communications with a first priority and the second subset of transmission occasions are used for communications with a second priority.

Aspect 9: The method of aspect 8, further comprising: receiving control information that activates the set of transmission occasions, and that indicates the first subset of transmission occasions and the second subset of transmission occasions.

Aspect 10: The method of any of aspects 1 through 9, wherein the first set of relay parameters indicates a first relaying type for the first plurality of scheduled resource grants, and the second set of relay parameters indicates a second relaying type for the second plurality of scheduled resource grants.

Aspect 11: The method of aspect 10, wherein the first relaying type and the second relaying type are selected from an amplify-and-forward (AF) relaying type, a decode-and-forward (DF) relaying type, or a compress-and-forward (CF) relaying type.

Aspect 12: The method of any of aspects 10 through 11, wherein the first relaying type and the second relaying type are selected based at least in part on a quality of service associated with the first plurality of scheduled resource grants and the second plurality of scheduled resource grants.

Aspect 13: A method for wireless communication at a receiving device, comprising: receiving control signaling for a plurality of scheduled resource grants from a transmitting device, the control signaling including one or more energy harvesting parameters that indicate a first portion of one or more of the plurality of scheduled resource grants is for data communications and a second portion of the one or more of the plurality of scheduled resource grants is for energy harvesting; receiving a first transmission of the plurality of scheduled resource grants from the transmitting device; decoding information from the first portion of the first transmission according to the one or more energy harvesting parameters; and harvesting energy from the second portion of the first transmission according to the one or more energy harvesting parameters.

Aspect 14: The method of aspect 13, wherein the one or more energy harvesting parameters indicate a time-switching energy harvesting configuration or a power-splitting energy harvesting configuration.

Aspect 15: The method of any of aspects 13 through 14, wherein the receiving the control signaling comprises: receiving first control signaling that indicates a first configuration index value that has a first energy harvesting configuration, and second control signaling that indicates a second configuration index value that has a second energy harvesting configuration, and wherein the first energy harvesting configuration and the second energy harvesting configuration each have different energy harvesting parameters.

Aspect 16: The method of any of aspects 13 through 15, wherein the one or more energy harvesting parameters provide time-switching energy harvesting parameters that indicate that the first portion is a first subset of symbols of the first transmission and the second portion is a second subset of symbols of the first transmission.

Aspect 17: The method of aspect 16, wherein the first subset of symbols is indicated by a starting symbol and number of symbols, or is indicated by a bitmap.

Aspect 18: The method of any of aspects 16 through 17, wherein the one or more energy harvesting parameters further provides a gap of one or more symbols between the first subset of symbols and the second subset of symbols.

Aspect 19: The method of any of aspects 13 through 18, further comprising: receiving control information that activates the plurality of scheduled resource grants and that indicates one or more of the energy harvesting parameters.

Aspect 20: A method for wireless communications at a base station, comprising: transmitting control signaling for a plurality of scheduled resource grants to a receiving device, the control signaling including one or more energy harvesting parameters that indicate a first portion of one or more of the plurality of scheduled resource grants is for data communications and a second portion of the one or more of the plurality of scheduled resource grants is for energy harvesting; encoding information into the first portion of a first transmission according to the one or more energy harvesting parameters; and transmitting the first transmission of the plurality of scheduled resource grants from the transmitting device, wherein the first portion of the first includes the encoded information and the second portion of the first transmission is transmitted using a transmit power that is selected to provide for efficient energy harvesting at the receiving device.

Aspect 21: The method of aspect 20, wherein the one or more energy harvesting parameters indicate a time-switching energy harvesting configuration or a power-splitting energy harvesting configuration.

Aspect 22: The method of any of aspects 20 through 21, further comprising: transmitting first control signaling that indicates a first configuration index value that has a first energy harvesting configuration, and second control signaling that indicates a second configuration index value that has a second energy harvesting configuration, and wherein the first energy harvesting configuration and the second energy harvesting configuration each have different energy harvesting parameters.

Aspect 23: The method of any of aspects 20 through 22, wherein the one or more energy harvesting parameters provide time-switching energy harvesting parameters that indicate that the first portion is a first subset of symbols of the first transmission and the second portion is a second subset of symbols of the first transmission.

Aspect 24: An apparatus for wireless communication at a first device, comprising a processor; memory coupled with the processor; and instructions stored in the memory and executable by the processor to cause the apparatus to perform a method of any of aspects 1 through 12.

Aspect 25: An apparatus for wireless communication at a first device, comprising at least one means for performing a method of any of aspects 1 through 12.

Aspect 26: A non-transitory computer-readable medium storing code for wireless communication at a first device, the code comprising instructions executable by a processor to perform a method of any of aspects 1 through 12.

Aspect 27: An apparatus for wireless communication at a receiving device, comprising a processor; memory coupled with the processor; and instructions stored in the memory and executable by the processor to cause the apparatus to perform a method of any of aspects 13 through 19.

Aspect 28: An apparatus for wireless communication at a receiving device, comprising at least one means for performing a method of any of aspects 13 through 19.

Aspect 29: A non-transitory computer-readable medium storing code for wireless communication at a receiving device, the code comprising instructions executable by a processor to perform a method of any of aspects 13 through 19.

Aspect 30: An apparatus for wireless communications at a base station, comprising a processor; memory coupled with the processor; and instructions stored in the memory and executable by the processor to cause the apparatus to perform a method of any of aspects 20 through 23.

Aspect 31: An apparatus for wireless communications at a base station, comprising at least one means for performing a method of any of aspects 20 through 23.

Aspect 32: A non-transitory computer-readable medium storing code for wireless communications at a base station, the code comprising instructions executable by a processor to perform a method of any of aspects 20 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first device, comprising:
   receiving control signaling for scheduled resource grants for communications to one or more receiving devices, the control signaling identifying a first set of relay parameters for relayed communications that use a first plurality of scheduled resource grants, and a second set of relay parameters for relayed communications that use a second plurality of scheduled resource grants, wherein the first plurality of scheduled resource grants use a first subset of a set of transmission occasions of a configured grant, and the second plurality of scheduled resource grants use a second subset of the set of transmission occasions of the configured grant, and wherein the first subset of transmission occasions are used for communications with a first priority and the second subset of transmission occasions are used for communications with a second priority;
   receiving control information that activates the set of transmission occasions, and that indicates the first subset of transmission occasions and the second subset of transmission occasions;
   determining that a first communication of two or more communications to be transmitted by the first device is a relayed communication for transmission using the first plurality of scheduled resource grants, and that a second communication of the two or more communications is a relayed communication for transmission using the second plurality of scheduled resource grants; and
   transmitting the first communication based at least in part on the first set of relay parameters and the second communication based at least in part on the second set of relay parameters.

2. The method of claim 1, wherein the first set of relay parameters indicates a first priority associated with the first plurality of scheduled resource grants and the second set of relay parameters indicates a second priority associated with the second plurality of scheduled resource grants, and wherein communications with the first priority are transmitted ahead of communications with the second priority when relayed by the first device.

3. The method of claim 2, wherein an indication of the first priority or the second priority is provided for each packet or transport block (TB) to be relayed by the first device.

4. The method of claim 2, wherein the control signaling indicates the first priority and the second priority from two or more different available levels of priority.

5. The method of claim 2, wherein the determining comprises:
   receiving, from one or more transmitting devices, the first communication and the second communication; and
   determining that the first communication has the first priority and that the second communication has the second priority, based at least in part on a priority indication associated with each of the first communication and the second communication.

6. The method of claim 1, wherein the first set of relay parameters is provided with a first configured grant that has an associated first priority, and the second set of relay parameters is provided with a second configured grant that has an associated second priority, and wherein communications with the first priority are transmitted ahead of communications with the second priority when relayed by the first device.

7. The method of claim 6, wherein each configured grant has an index value, and each index value has an associated priority.

8. A method for wireless communication at a first device, comprising:
   receiving control signaling for scheduled resource grants for communications to one or more receiving devices, the control signaling identifying a first set of relay parameters for relayed communications that use a first plurality of scheduled resource grants, and a second set of relay parameters for relayed communications that use a second plurality of scheduled resource grants, wherein the first set of relay parameters indicates a first relaying type for the first plurality of scheduled resource grants, and the second set of relay parameters indicates a second relaying type for the second plurality of scheduled resource grants, and wherein the first relaying type and the second relaying type are selected:
      from an amplify-and-forward (AF) relaying type, a decode-and-forward (DF) relaying type, or a compress-and-forward (CF) relaying type; or based at least in part on a quality of service associated with the first plurality of scheduled resource grants and the second plurality of scheduled resource grants;

determining that a first communication of two or more communications to be transmitted by the first device is a relayed communication for transmission using the first plurality of scheduled resource grants, and that a second communication of the two or more communications is a relayed communication for transmission using the second plurality of scheduled resource grants; and transmitting the first communication based at least in part on the first set of relay parameters and the second communication based at least in part on the second set of relay parameters.

9. A first device for wireless communication, comprising:
one or more memories storing processor-executable code; and
one or more processors coupled with the one or more memories and operable to execute the code to cause the first device to:
receive control signaling for scheduled resource grants for communications to one or more receiving devices, the control signaling identifying a first set of relay parameters for relayed communications that use a first plurality of scheduled resource grants, and a second set of relay parameters for relayed communications that use a second plurality of scheduled resource grants, wherein the first plurality of scheduled resource grants use a first subset of a set of transmission occasions of a configured grant, and the second plurality of scheduled resource grants use a second subset of the set of transmission occasions of the configured grant, and wherein the first subset of transmission occasions are used for communications with a first priority and the second subset of transmission occasions are used for communications with a second priority;
receive control information that activates the set of transmission occasions, and that indicates the first subset of transmission occasions and the second subset of transmission occasions;
determine that a first communication of two or more communications to be transmitted by the first device is a relayed communication for transmission using the first plurality of scheduled resource grants, and that a second communication of the two or more communications is a relayed communication for transmission using the second plurality of scheduled resource grants; and
transmit the first communication based at least in part on the first set of relay parameters and the second communication based at least in part on the second set of relay parameters.

10. The first device of claim 9, wherein the first set of relay parameters indicates a first priority associated with the first plurality of scheduled resource grants and the second set of relay parameters indicates a second priority associated with the second plurality of scheduled resource grants, and wherein communications with the first priority are transmitted ahead of communications with the second priority when relayed by the first device.

11. The first device of claim 10, wherein an indication of the first priority or the second priority is provided for each packet or transport block (TB) to be relayed by the first device.

12. The first device of claim 10, wherein the control signaling indicates the first priority and the second priority from two or more different available levels of priority.

13. The first device of claim 10, wherein, to cause the first device to determine, the one or more processors are further operable to execute the code to cause the first device to:
receive, from one or more transmitting devices, the first communication and the second communication; and
determine that the first communication has the first priority and that the second communication has the second priority, based at least in part on a priority indication associated with each of the first communication and the second communication.

14. The first device of claim 9, wherein the first set of relay parameters is provided with a first configured grant that has an associated first priority, and the second set of relay parameters is provided with a second configured grant that has an associated second priority, and wherein communications with the first priority are transmitted ahead of communications with the second priority when relayed by the first device.

15. A non-transitory computer-readable medium storing code for wireless communication at a first device, the code comprising instructions executable by one or more processors to:
receive control signaling for scheduled resource grants for communications to one or more receiving devices, the control signaling identifying a first set of relay parameters for relayed communications that use a first plurality of scheduled resource grants, and a second set of relay parameters for relayed communications that use a second plurality of scheduled resource grants, wherein the first plurality of scheduled resource grants use a first subset of a set of transmission occasions of a configured grant, and the second plurality of scheduled resource grants use a second subset of the set of transmission occasions of the configured grant, and wherein the first subset of transmission occasions are used for communications with a first priority and the second subset of transmission occasions are used for communications with a second priority;
receive control information that activates the set of transmission occasions, and that indicates the first subset of transmission occasions and the second subset of transmission occasions;
determine that a first communication of two or more communications to be transmitted by the first device is a relayed communication for transmission using the first plurality of scheduled resource grants, and that a second communication of the two or more communications is a relayed communication for transmission using the second plurality of scheduled resource grants; and
transmit the first communication based at least in part on the first set of relay parameters and the second communication based at least in part on the second set of relay parameters.

16. The non-transitory computer-readable medium of claim 15, wherein the first set of relay parameters indicates a first priority associated with the first plurality of scheduled resource grants and the second set of relay parameters indicates a second priority associated with the second plurality of scheduled resource grants, and wherein communications with the first priority are transmitted ahead of communications with the second priority when relayed by the first device.

17. The non-transitory computer-readable medium of claim 16, wherein an indication of the first priority or the second priority is provided for each packet or transport block (TB) to be relayed by the first device.

18. The non-transitory computer-readable medium of claim 16, wherein the control signaling indicates the first priority and the second priority from two or more different available levels of priority.

19. The non-transitory computer-readable medium of claim 16, wherein the instructions to determine are further executable by the one or more processors to:
receive from one or more transmitting devices, the first communication and the second communication; and
determine that the first communication has the first priority and that the second communication has the second priority, based at least in part on a priority indication associated with each of the first communication and the second communication.

20. The non-transitory computer-readable medium of claim 15, wherein the first set of relay parameters is provided with a first configured grant that has an associated first priority, and the second set of relay parameters is provided with a second configured grant that has an associated second priority, and wherein communications with the first priority are transmitted ahead of communications with the second priority when relayed by the first device.

21. A first device for wireless communication, comprising:
means for receiving control signaling for scheduled resource grants for communications to one or more receiving devices, the control signaling identifying a first set of relay parameters for relayed communications that use a first plurality of scheduled resource grants, and a second set of relay parameters for relayed communications that use a second plurality of scheduled resource grants, wherein the first plurality of scheduled resource grants use a first subset of a set of transmission occasions of a configured grant, and the second plurality of scheduled resource grants use a second subset of the set of transmission occasions of the configured grant, and wherein the first subset of transmission occasions are used for communications with a first priority and the second subset of transmission occasions are used for communications with a second priority;
receiving control information that activates the set of transmission occasions, and that indicates the first subset of transmission occasions and the second subset of transmission occasions;
means for determining that a first communication of two or more communications to be transmitted by the first device is a relayed communication for transmission using the first plurality of scheduled resource grants, and that a second communication of the two or more communications is a relayed communication for transmission using the second plurality of scheduled resource grants; and
means for transmitting the first communication based at least in part on the first set of relay parameters and the second communication based at least in part on the second set of relay parameters.

22. The first device of claim 21, wherein the first set of relay parameters indicates a first priority associated with the first plurality of scheduled resource grants and the second set of relay parameters indicates a second priority associated with the second plurality of scheduled resource grants, and wherein communications with the first priority are transmitted ahead of communications with the second priority when relayed by the first device.

23. The first device of claim 22, wherein an indication of the first priority or the second priority is provided for each packet or transport block (TB) to be relayed by the first device.

24. The first device of claim 22, wherein the control signaling indicates the first priority and the second priority from two or more different available levels of priority.

25. The first device of claim 22, wherein the means for the determining comprise:
means for receiving, from one or more transmitting devices, the first communication and the second communication; and
means for determining that the first communication has the first priority and that the second communication has the second priority, based at least in part on a priority indication associated with each of the first communication and the second communication.

26. The first device of claim 21, wherein the first set of relay parameters is provided with a first configured grant that has an associated first priority, and the second set of relay parameters is provided with a second configured grant that has an associated second priority, and wherein communications with the first priority are transmitted ahead of communications with the second priority when relayed by the first device.

27. A first device for wireless communication, comprising:
one or more memories storing processor-executable code; and
one or more processors coupled with the one or more memories and operable to execute the code to cause the first device to:
receive control signaling for scheduled resource grants for communications to one or more receiving devices, the control signaling identifying a first set of relay parameters for relayed communications that use a first plurality of scheduled resource grants, and a second set of relay parameters for relayed communications that use a second plurality of scheduled resource grants, wherein the first set of relay parameters indicates a first relaying type for the first plurality of scheduled resource grants, and the second set of relay parameters indicates a second relaying type for the second plurality of scheduled resource grants, and wherein the first relaying type and the second relaying type are selected:
from an amplify-and-forward (AF) relaying type, a decode-and-forward (DF) relaying type, or a compress-and-forward (CF) relaying type; or
based at least in part on a quality of service associated with the first plurality of scheduled resource grants and the second plurality of scheduled resource grants;
determine that a first communication of two or more communications to be transmitted by the first device is a relayed communication for transmission using the first plurality of scheduled resource grants, and that a second communication of the two or more communications is a relayed communication for transmission using the second plurality of scheduled resource grants; and
transmit the first communication based at least in part on the first set of relay parameters and the second communication based at least in part on the second set of relay parameters.

* * * * *

UNITED STATES PATENT AND TRADEMARK OFFICE
CERTIFICATE OF CORRECTION

| | | |
|---|---|---|
| PATENT NO. | : 12,120,664 B2 | Page 1 of 1 |
| APPLICATION NO. | : 17/483495 | |
| DATED | : October 15, 2024 | |
| INVENTOR(S) | : Elshafie et al. | |

It is certified that error appears in the above-identified patent and that said Letters Patent is hereby corrected as shown below:

On the Title Page

Under (*) Notice, Line 4, delete:
"This patent is subject to a terminal disclaimer."

Signed and Sealed this
Tenth Day of December, 2024

Katherine Kelly Vidal
*Director of the United States Patent and Trademark Office*